(12) United States Patent
Tong et al.

(10) Patent No.: US 11,303,850 B2
(45) Date of Patent: Apr. 12, 2022

(54) COMMUNICATION USING INTERACTIVE AVATARS

(71) Applicant: Intel Corporation, Santa Clara, CA (US)

(72) Inventors: Xiaofeng Tong, Beijing (CN); Wenlong Li, Beijing (CN); Yangzhou Du, Beijing (CN); Wei Hu, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/039,416

(22) Filed: Sep. 30, 2020

(65) Prior Publication Data

US 2021/0105438 A1 Apr. 8, 2021

Related U.S. Application Data

(63) Continuation of application No. 16/453,507, filed on Jun. 26, 2019, now abandoned, which is a
(Continued)

(51) Int. Cl.
*H04N 7/15* (2006.01)
*H04M 1/72439* (2021.01)
*G06T 13/40* (2011.01)
*H04N 7/14* (2006.01)
*G06F 3/0482* (2013.01)
(Continued)

(52) U.S. Cl.
CPC ........... *H04N 7/157* (2013.01); *G06F 3/0482* (2013.01); *G06F 3/04883* (2013.01); *G06K 9/00255* (2013.01); *G06K 9/00268* (2013.01); *G06T 13/40* (2013.01); *G10L 21/003* (2013.01);
(Continued)

(58) Field of Classification Search
CPC combination set(s) only.
See application file for complete search history.

(56) References Cited

U.S. PATENT DOCUMENTS

| 4,149,930 A | 4/1979 | Exner et al. |
| 5,880,731 A | 3/1999 | Liles et al. |

(Continued)

FOREIGN PATENT DOCUMENTS

| CN | 1532775 | 9/2004 |
| CN | 1732687 | 2/2006 |

(Continued)

OTHER PUBLICATIONS

United States Patent and Trademark Office, "Non-Final Office Action," issued in connection with U.S. Appl. No. 15/395,661 dated Apr. 13, 2018, 10 pages.

(Continued)

*Primary Examiner* — Phung-Hoang J Nguyen
(74) *Attorney, Agent, or Firm* — Hanley, Flight & Zimmerman, LLC

(57) ABSTRACT

Generally this disclosure describes a video communication system that replaces actual live images of the participating users with animated avatars. A method may include selecting an avatar; initiating communication; detecting a user input; identifying the user input; identifying an animation command based on the user input; generating avatar parameters; and transmitting at least one of the animation command and the avatar parameters.

26 Claims, 5 Drawing Sheets

Related U.S. Application Data continuation of application No. 15/395,580, filed on Dec. 30, 2016, now abandoned, which is a continuation of application No. 15/184,355, filed on Jun. 16, 2016, now abandoned, which is a continuation of application No. 13/996,009, filed as application No. PCT/CN2012/000458 on Apr. 9, 2012, now Pat. No. 9,386,268.

(51) Int. Cl.

| | |
|---|---|
| G06F 3/0488 | (2013.01) |
| G06K 9/00 | (2006.01) |
| G10L 21/003 | (2013.01) |
| G10L 21/013 | (2013.01) |
| G06F 3/04883 | (2022.01) |

(52) U.S. Cl.
CPC ....... G10L 21/013 (2013.01); H04M 1/72439 (2021.01); H04N 7/147 (2013.01)

(56) References Cited

U.S. PATENT DOCUMENTS

| | | | |
|---|---|---|---|
| 5,953,700 | A | 9/1999 | Kanevsky et al. |
| 6,072,496 | A | 6/2000 | Guenter et al. |
| 6,307,576 | B1 | 10/2001 | Rosenfeld |
| 6,313,864 | B1 | 11/2001 | Tabata et al. |
| 6,477,239 | B1 | 11/2002 | Ohki et al. |
| 6,545,682 | B1 | 4/2003 | Ventrella et al. |
| 6,580,811 | B2 | 6/2003 | Maurer et al. |
| 6,611,278 | B2 | 8/2003 | Rosenfeld |
| 7,003,501 | B2 | 2/2006 | Ostroff |
| 7,076,118 | B1 | 7/2006 | Westerman |
| 7,116,330 | B2 | 10/2006 | Marshall et al. |
| 7,176,956 | B2 | 2/2007 | Rzeszewski et al. |
| 7,237,717 | B1 | 7/2007 | Rao et al. |
| 7,386,799 | B1 | 6/2008 | Clanton et al. |
| 7,447,211 | B1 | 11/2008 | Scholte |
| 7,564,476 | B1 | 7/2009 | Coughlan et al. |
| 7,716,133 | B1 | 5/2010 | Foote et al. |
| 7,752,270 | B2 | 7/2010 | Durand et al. |
| 7,883,415 | B2 | 2/2011 | Larsen et al. |
| 8,111,281 | B2 | 2/2012 | Sangberg et al. |
| 8,260,262 | B2 | 9/2012 | Ben Ayed |
| 8,581,911 | B2 | 11/2013 | Becker et al. |
| 8,758,132 | B2 | 6/2014 | Marks et al. |
| 8,840,470 | B2 | 9/2014 | Zalewski et al. |
| 8,848,068 | B2 | 9/2014 | Pfister et al. |
| 8,988,436 | B2 | 3/2015 | Becker et al. |
| 9,104,908 | B1 | 8/2015 | Rogers et al. |
| 9,111,134 | B1 | 8/2015 | Rogers et al. |
| 9,134,816 | B2 | 9/2015 | Dahlkvist et al. |
| 9,300,901 | B2 | 3/2016 | Grundhofer et al. |
| 9,330,483 | B2 | 5/2016 | Du et al. |
| 9,357,174 | B2 | 5/2016 | Li et al. |
| 9,361,723 | B2 | 6/2016 | Zhou et al. |
| 9,386,268 | B2 | 7/2016 | Tong et al. |
| 9,398,262 | B2 | 7/2016 | Li et al. |
| 9,489,760 | B2 | 11/2016 | Li et al. |
| 9,589,357 | B2 | 3/2017 | Li et al. |
| 9,626,788 | B2 | 4/2017 | Corazza et al. |
| 9,747,695 | B2 | 8/2017 | Lucey |
| 9,799,133 | B2 | 10/2017 | Tong et al. |
| 9,824,502 | B2 | 11/2017 | Tong et al. |
| 9,830,728 | B2 | 11/2017 | Fang et al. |
| 10,176,619 | B2 | 1/2019 | Jiao et al. |
| 10,475,225 | B2 | 11/2019 | Park et al. |
| 10,540,800 | B2 | 1/2020 | Tong et al. |
| 10,740,944 | B2 | 8/2020 | Fang et al. |
| 10,776,980 | B2 | 9/2020 | Jiao et al. |
| 2002/0029258 | A1 | 3/2002 | Mousseau et al. |
| 2002/0197967 | A1 | 12/2002 | Scholl et al. |
| 2003/0142236 | A1 | 7/2003 | Aratani et al. |
| 2003/0182122 | A1 | 9/2003 | Horinaka et al. |
| 2003/0206171 | A1 | 11/2003 | Kim et al. |
| 2003/0225846 | A1 | 12/2003 | Heikes et al. |
| 2004/0130614 | A1 | 7/2004 | Valliath et al. |
| 2004/0179037 | A1 | 9/2004 | Blattner et al. |
| 2004/0201666 | A1 | 10/2004 | Matsuo et al. |
| 2005/0162419 | A1 | 7/2005 | Kim et al. |
| 2005/0271252 | A1 | 12/2005 | Yamada |
| 2006/0023923 | A1 | 2/2006 | Geng et al. |
| 2006/0079325 | A1 | 4/2006 | Trajkovic et al. |
| 2006/0294465 | A1 | 12/2006 | Ronnen et al. |
| 2007/0019855 | A1 | 1/2007 | Marlett et al. |
| 2007/0019885 | A1 | 1/2007 | Chatting et al. |
| 2007/0065039 | A1 | 3/2007 | Park et al. |
| 2007/0201730 | A1 | 8/2007 | Masaki et al. |
| 2007/0230794 | A1 | 10/2007 | McAlpine et al. |
| 2007/0263075 | A1 | 11/2007 | Nimri et al. |
| 2007/0295382 | A1 | 12/2007 | Oak |
| 2008/0059570 | A1 | 3/2008 | Bill |
| 2008/0136814 | A1 | 6/2008 | Chu et al. |
| 2008/0170777 | A1 | 7/2008 | Sullivan et al. |
| 2008/0214168 | A1 | 9/2008 | Bailey et al. |
| 2008/0267459 | A1 | 10/2008 | Nakada et al. |
| 2009/0002479 | A1 | 1/2009 | Sangberg et al. |
| 2009/0055484 | A1 | 2/2009 | Vuong et al. |
| 2009/0066700 | A1 | 3/2009 | Harding et al. |
| 2009/0128579 | A1 | 5/2009 | Xie |
| 2009/0158160 | A1 | 6/2009 | Alberth, Jr. et al. |
| 2009/0232409 | A1 | 9/2009 | Marchesotti |
| 2009/0300513 | A1 | 12/2009 | Nims et al. |
| 2009/0315893 | A1 | 12/2009 | Smith et al. |
| 2010/0018382 | A1 | 1/2010 | Feeney et al. |
| 2010/0070858 | A1 | 3/2010 | Morris et al. |
| 2010/0071008 | A1 | 3/2010 | Hu |
| 2010/0082345 | A1 | 4/2010 | Wang et al. |
| 2010/0146052 | A1 | 6/2010 | Pare et al. |
| 2010/0156781 | A1 | 6/2010 | Fahn |
| 2010/0189354 | A1 | 7/2010 | de Campos et al. |
| 2010/0203968 | A1 | 8/2010 | Gill et al. |
| 2010/0211397 | A1 | 8/2010 | Park et al. |
| 2010/0220897 | A1 | 9/2010 | Ueno et al. |
| 2010/0281432 | A1 | 11/2010 | Geisner et al. |
| 2010/0302252 | A1 | 12/2010 | Petrovic et al. |
| 2011/0007079 | A1 | 1/2011 | Perez et al. |
| 2011/0007142 | A1 | 1/2011 | Perez et al. |
| 2011/0007174 | A1 | 1/2011 | Bacivarov et al. |
| 2011/0025689 | A1 | 2/2011 | Perez et al. |
| 2011/0064388 | A1 | 3/2011 | Brown et al. |
| 2011/0085139 | A1 | 4/2011 | Blixt et al. |
| 2011/0162082 | A1 | 6/2011 | Paksoy et al. |
| 2011/0252144 | A1 | 10/2011 | Tung et al. |
| 2011/0292051 | A1 | 12/2011 | Nelson et al. |
| 2011/0296324 | A1* | 12/2011 | Goossens ............ G06F 3/04883 715/763 |
| 2011/0304629 | A1* | 12/2011 | Winchester ............ G06T 13/40 345/473 |
| 2011/0307837 | A1 | 12/2011 | Cohen et al. |
| 2012/0058747 | A1 | 3/2012 | Yiannios et al. |
| 2012/0075463 | A1 | 3/2012 | Chen et al. |
| 2012/0079377 | A1 | 3/2012 | Goossens |
| 2012/0079378 | A1 | 3/2012 | Goossens |
| 2012/0115584 | A1 | 5/2012 | Nguyen et al. |
| 2012/0130717 | A1 | 5/2012 | Xu et al. |
| 2012/0139830 | A1 | 6/2012 | Hwang et al. |
| 2012/0139899 | A1 | 6/2012 | Winchester |
| 2012/0206558 | A1 | 8/2012 | Setton |
| 2013/0002669 | A1 | 1/2013 | Rhee et al. |
| 2013/0004028 | A1 | 1/2013 | Jones et al. |
| 2013/0013089 | A1 | 1/2013 | Kawakami et al. |
| 2013/0019154 | A1 | 1/2013 | Wolfston, Jr. et al. |
| 2013/0038601 | A1 | 2/2013 | Han et al. |
| 2013/0096916 | A1 | 4/2013 | Pemmaraju |
| 2013/0109302 | A1 | 5/2013 | Levien et al. |
| 2013/0120522 | A1 | 5/2013 | Lian et al. |
| 2013/0132091 | A1 | 5/2013 | Skerpac |
| 2013/0147788 | A1 | 6/2013 | Weise et al. |
| 2013/0147845 | A1 | 6/2013 | Xie et al. |
| 2013/0217364 | A1 | 8/2013 | Varoglu et al. |
| 2013/0219166 | A1 | 8/2013 | Ristov et al. |
| 2013/0232578 | A1 | 9/2013 | Chevallier-Mames et al. |

(56) References Cited

U.S. PATENT DOCUMENTS

| | | |
|---|---|---|
| 2013/0235045 A1 | 9/2013 | Corazza et al. |
| 2013/0286161 A1 | 10/2013 | Lv et al. |
| 2013/0293584 A1 | 11/2013 | Anderson |
| 2014/0026102 A1 | 1/2014 | Kinn |
| 2014/0035934 A1 | 2/2014 | Du et al. |
| 2014/0043329 A1 | 2/2014 | Wang et al. |
| 2014/0055554 A1 | 2/2014 | Du et al. |
| 2014/0085293 A1 | 3/2014 | Konoplev et al. |
| 2014/0093083 A1 | 4/2014 | Dadu et al. |
| 2014/0152758 A1 | 6/2014 | Tong et al. |
| 2014/0153832 A1 | 6/2014 | Kawatra et al. |
| 2014/0154659 A1 | 6/2014 | Otwell |
| 2014/0162612 A1 | 6/2014 | Ma |
| 2014/0176662 A1 | 6/2014 | Goodman et al. |
| 2014/0181229 A1 | 6/2014 | Tucker et al. |
| 2014/0198121 A1 | 7/2014 | Tong et al. |
| 2014/0218371 A1 | 8/2014 | Du et al. |
| 2014/0218459 A1 | 8/2014 | Wenlong et al. |
| 2014/0267413 A1 | 9/2014 | Du et al. |
| 2014/0355861 A1 | 12/2014 | Nirenberg et al. |
| 2014/0362091 A1 | 12/2014 | Bouaziz et al. |
| 2015/0084950 A1 | 3/2015 | Li et al. |
| 2015/0286858 A1 | 10/2015 | Shaburov et al. |
| 2015/0310263 A1 | 10/2015 | Zhang et al. |
| 2015/0312523 A1 | 10/2015 | Li et al. |
| 2015/0332088 A1 | 11/2015 | Chembula |
| 2015/0381939 A1 | 12/2015 | Cunico et al. |
| 2016/0027200 A1 | 1/2016 | Corazza et al. |
| 2016/0163084 A1 | 6/2016 | Corazza et al. |
| 2016/0180568 A1 | 6/2016 | Bullivant et al. |
| 2016/0203827 A1 | 7/2016 | Leff et al. |
| 2016/0328875 A1 | 11/2016 | Fang et al. |
| 2016/0328876 A1 | 11/2016 | Tong et al. |
| 2016/0328886 A1 | 11/2016 | Tong et al. |
| 2016/0364895 A1 | 12/2016 | Santossio et al. |
| 2017/0039751 A1 | 2/2017 | Tong et al. |
| 2017/0054945 A1 | 2/2017 | Li et al. |
| 2017/0111614 A1 | 4/2017 | Tong et al. |
| 2017/0111615 A1 | 4/2017 | Li et al. |
| 2017/0111616 A1 | 4/2017 | Li et al. |
| 2017/0118145 A1 | 4/2017 | Aittoniemi et al. |
| 2017/0132828 A1 | 5/2017 | Zelenin et al. |
| 2017/0256086 A1 | 9/2017 | Park et al. |
| 2017/0301125 A1 | 10/2017 | Bouaziz et al. |
| 2017/0310934 A1 | 10/2017 | Du et al. |
| 2018/0025506 A1 | 1/2018 | Li et al. |
| 2018/0300925 A1 | 10/2018 | Fang et al. |
| 2019/0320144 A1 | 10/2019 | Tong et al. |
| 2020/0051306 A1 | 2/2020 | Park et al. |
| 2021/0056746 A1 | 2/2021 | Fang et al. |

FOREIGN PATENT DOCUMENTS

| | | |
|---|---|---|
| CN | 1762145 | 4/2006 |
| CN | 1832604 | 9/2006 |
| CN | 1920886 | 2/2007 |
| CN | 1972274 | 5/2007 |
| CN | 101035242 | 9/2007 |
| CN | 101098241 | 1/2008 |
| CN | 101110937 | 1/2008 |
| CN | 201000895 | 1/2008 |
| CN | 101149840 | 3/2008 |
| CN | 101217511 | 7/2008 |
| CN | 100413362 | 8/2008 |
| CN | 101354795 | 1/2009 |
| CN | 101378237 | 3/2009 |
| CN | 201226500 | 4/2009 |
| CN | 101472158 | 7/2009 |
| CN | 101499128 | 8/2009 |
| CN | 101669328 | 3/2010 |
| CN | 101677389 | 3/2010 |
| CN | 101690071 | 3/2010 |
| CN | 101826217 | 9/2010 |
| CN | 101924924 | 12/2010 |
| CN | 101981538 | 2/2011 |
| CN | 102046249 | 5/2011 |
| CN | 102087750 | 6/2011 |
| CN | 102157007 | 8/2011 |
| CN | 102158816 | 8/2011 |
| CN | 102176197 | 9/2011 |
| CN | 102214288 | 10/2011 |
| CN | 102255336 | 11/2011 |
| CN | 102271241 | 12/2011 |
| CN | 102413886 | 4/2012 |
| CN | 1009333 | 6/2012 |
| CN | 102934144 | 2/2013 |
| CN | 103093490 | 5/2013 |
| CN | 103593650 | 2/2014 |
| CN | 103942822 | 7/2014 |
| CN | 10411738 | 8/2014 |
| CN | 104011738 | 8/2014 |
| CN | 104205171 | 12/2014 |
| CN | 107209953 | 9/2017 |
| EP | 2431936 | 3/2012 |
| FR | 2924864 | 6/2009 |
| JP | 2003046109 | 2/2003 |
| JP | 2003244425 | 8/2003 |
| JP | 2005018305 | 1/2005 |
| JP | 2005173772 | 6/2005 |
| JP | H09311945 | 12/2006 |
| JP | 2007220004 | 8/2007 |
| JP | 2009199417 | 9/2009 |
| JP | 2012022403 | 2/2012 |
| JP | 2013206135 | 10/2015 |
| KR | 1020050031020 | 4/2005 |
| TW | M290286 | 5/2006 |
| TW | 200841736 | 10/2008 |
| TW | 200945074 | 11/2009 |
| TW | 201136372 | 10/2011 |
| TW | 201205122 | 2/2012 |
| TW | 201303747 | 1/2013 |
| TW | 201352003 | 12/2013 |
| TW | I526947 | 3/2016 |
| WO | 0209040 | 1/2002 |
| WO | 2009122007 | 10/2009 |
| WO | 2009128784 | 10/2009 |
| WO | 2010128830 | 11/2010 |
| WO | 20110127309 | 10/2011 |
| WO | 2012139276 | 10/2012 |
| WO | 20130074153 | 5/2013 |
| WO | 2013097139 | 7/2013 |
| WO | 2013097264 | 7/2013 |
| WO | 2013152453 | 10/2013 |
| WO | 2013152454 | 10/2013 |
| WO | 2013152455 | 10/2013 |
| WO | 20140036708 | 3/2014 |
| WO | 2014094199 | 6/2014 |
| WO | 2014194439 | 12/2014 |
| WO | 2016101124 | 6/2016 |
| WO | 2016101131 | 6/2016 |
| WO | 2016101132 | 6/2016 |

OTHER PUBLICATIONS

International Searching Authority, "International Search Report and Written Opinion," issued in connection with Application No. PCT/CN201387127, dated Mar. 27, 2014, 7 pages.

The International Bureau, "International Preliminary Report on Patentability," issued in connection with application No. PCT/CN2013087127, dated May 17, 2016, 5 pages.

United States Patent and Trademark Office, "Non-Final Office Action," issued in connection with U.S. Appl. No. 14/358,394, dated Feb. 25, 2016, 13 pages.

United States Patent and Trademark Office, "Notice of Allowance," issued in connection with U.S. Appl. No. 14/358,394, dated Jul. 1, 2016, 10 pages.

National Intellectual Property Administration, P.R. China, "First Office Action," issued in connection with Application No. 201710032311, dated Jul. 30, 2019, 29 pages.

Search Report of R.O.C, "Taiwan Search Report," in connection with Application No. 107137526, completed on Aug. 6, 2019, 3 pages.

(56) References Cited

OTHER PUBLICATIONS

United States Patent and Trademark Office, "Final Office Action," issued in connection with U.S. Appl. No. 16/453,507, dated May 1, 2020, 14 pages.
United States Patent and Trademark Office, "Non-Final Office Action," issued in connection with U.S. Appl. No. 16/453,507, dated Sep. 26, 2019, 13 pages.
United States Patent and Trademark Office, "Notice of Allowance," issued in connection with U.S. Appl. No. 13/996,009, dated Mar. 14, 2016, 17 pages.
"Digital rights management," Wikipedia, The Free Encyclopedia, retrieved from: <"https://en.wikipedia.org/w/index.php?title=Digital_rights_management&oldid=1021194441">, edited May 3, 2021, 32 pages.
"Multi-factor authentication," Wikipedia, The Free Encyclopedia, retrieved from: <"https://en.wikipedia.org/w/index.php?title=Multi-factor_authentication&oldid=476406166">, edited May 10, 2021, 3 pages.
"Speaker recognition," Wikipedia, The Free Encyclopedia, retrieved from: <"https://en.wikipedia.org/w/index.php?title=Speaker_recognition&oldid=1020702049">, edited Apr. 30, 2021, 6 pages.
"Speech recognition," Wikipedia, The Free Encyclopedia, retrieved from: <"https://en.wikipedia.org/w/index.php?title=Speech_recognition&oldid=1021739807">, edited May 6, 2021, 28 pages.
"Evaluation of Face Recognition Algorithms", http://www.cs.colostate.edu/evalfacerec/index10.php, Colorado State University, Fort Collins, CO, 2010. Retrieved Dec. 22, 2011, 1 Page.
International Searching Authority, "International Search Report and Written Opinion," issued in connection with application No. PCT/CN2012/000461, dated Oct. 4, 2012, 8 Pages.
International Searching Authority, "International Search Report and Written Opinion," issued in connection with application No. PCT/CN2012/084902, dated Feb. 7, 20213, 14 Pages.
International Searching Authority, "International Search Report and Written Opinion," issued in connection with application No. PCT/CN2012/000458, dated Jan. 24, 2013, 11 Pages.
International Search Report and Written Opinion received for PCT Patent Application No. PCT/CN2012/000459, dated Jan. 17, 2013, 11 Pages.
International Searching Authority, "International Search Report and Written Opinion," issued in connection with PCT Patent Application No. PCT/CN2012/000460, dated Dec. 20, 2012, 9 pages.
International Searching Authority, "International Search Report and Written Opinion," issued in connection with application No. PCT/CN2011/072603, dated Oct. 27, 2011, 11 Pages.
3D Face Modeller: 3D Face Generator, downloaded from www.facegen.com/modeller, 2021, 4 Pages.
3D PhotoFace, downloaded from www.oddcase.com/technologies/photoface, 1 Page.
"ITU Gaza Tracker", downloaded from www.gazegroup.org/downloads/23-gazetracker, 4 pages.
"Opengazer: open-sourse gaze tracker for ordinary webcams", downloaded from www.inference.phy,cam.ac.uk/opengazer, 7 Pages.
"Introducting Tobii Technology", downloaded from www.tobii.com, 2 pages.
"Gazelib", downloaded from code.google.com/p/gazelib, 1 Page.
Viola, et al., "Rapid Object Detection using a Boosted Cascade of Simple Featuers", Accepted Conference on Computer Vision and Pattern Recognition 2001, 9 pages.
Beveridge et al., The CSU Face Identification Evaluation System; Its purpose, features and structure, Colorado State University, Aug. 20, 2004, 11 pages.
Visual Avatar Chat—Free Chat Server, downloaded from http://visualchat.weirdoz.org, 2 pages.
Wang et al., "The Cartoon Animation Filter," AMC Transactions of Graphics, Jul. 2006, 5 pages.
United States Patent and Trademark Office, "Final Office Action," issued in connection with U.S. Appl. No. 13/996,009, dated Oct. 23, 2015, 10 pages.
United States Patent and Trademark Office, "Non-Final Office Action," issued in connection with U.S. Appl. No. 13/996,009, dated Apr. 24, 2015, 15 pages.
United States Patent and Trademark Office, "Notice of Allowance," issued in connection with U.S. Appl. No. 13/996,009, dated Mar. 14, 2016, 15 pages.
United States Patent and Trademark Office, "Final Office Action," issued in connection with U.S. Appl. No. 15/395,580, dated Dec. 26, 2018, 14 pages.
United States Patent and Trademark Office, "Non-Final Office Action," issued in connection with U.S. Appl. No. 15/395,580, dated Jun. 26, 2018, 17 pages.
Chinese Patent Office, "Notice of Allowance," issued in connection with application No. 106103276, dated Sep. 19, 2018, 3 pages.
United States Patent and Trademark Office, "Non-Final Office Action," issued in connection with U.S. Appl. No. 15/395,661, dated Feb. 23, 2017, 11 pages.
United States Patent and Trademark Office, "Non-Final Office Action," issued in connection with U.S. Appl. No. 15/395,661, dated May 11, 2017, 16 pages.
Chinese Patent Office, "Office Action and Search Report," issued in connection with Chinese Application No. 201280071927.3, dated Oct. 9, 2016, with English translation, 23 pages.
Reallusion, "Create Your Own Talking Avatars—Crazy Talk Avatar Creator," CrazyTalk Avatar, downloaded from http:www.reallusion.com/crazytalklavatar.html, Mar. 13, 2017, 10 pages.
"CrazyTalk 7.3 Tutorial—Custom Motion Clip Strength,", CrazyTalk Presentation YouTube Video, downloaded from https:l/www.youtube.com/watch?v=VXRjX5bNGKA, Mar. 13, 2017, 3 pages.
Reallusion, "Crazy Talk Animator 3—Create Animated Videos and Presentations," CrazyTalk Presentation Information, downloaded from http://www.reallusion.com/crazytalkpresentation/default.aspx, Mar. 14, 2017, 8 pages.
CrazyTalk Online Manual, downloaded from http://manual.reallusion.com/CrazyTalk_8/ENU/Default.htm, Apr. 11, 2017, 1 page.
FaceRig, downloaded from https://facerig.com/, Mar. 2, 2017, 6 pages.
FaceRig FAQs, downloaded from https://facerig_com/faq/, Mar. 2, 2017, 8 pages.
FaceRig Tips, downloaded from https://facerig_com/tips/, Mar. 14, 2017, 12 pages.
FaceRig's Indiegogo, downloaded from https:l/www.indiegogo.com/projects/facerig#/, Mar. 14, 2017, 30 pages.
FaceRig on Steam, downloaded from http:l/store.steampowered.com/app/274920, Mar. 2, 2017, 5 pages.
FaceRig Steam Community, downloaded from http://steamcommunity.com/app/274920, Mar. 2, 2017, 7 pages.
FaceRig Steam Community Guides, downloaded from http://steamcommunity.com/app/274920/guides/, Mar. 2, 2017, 2 pages.
FaceRig YouTube Video channel, downloaded from http:l/www.youtube.com/facerig, Mar. 14, 2017, 2 pages.
Taiwanese Patent Office, "Office Action," issued in connection with Taiwanese Patent Application No. 102112378, dated Nov. 13, 2014, with English translation, 23 pages.
Taiwanese Office Action received for Taiwanese Patent Application No. 102112378, dated Apr. 10, 2015, with English translation, 5 pages.
International Bureau, "International Preliminary Report on Patentability and Written Opinion," received for PCT Patent Application No. PCT/CN2012/000460, dated Oct. 23, 2014, 7 pages.
International Bureau, "International Preliminary Report on Patentability and Written Opinion," received for PCT Patent Application No. PCT/CN2012/000461, dated Jul. 10, 2014, 7 pages.
United States Patent and Trademark Office, "Office Action," issued in U.S. Appl. No. 13/997,266, dated Sep. 17, 2015, 16 pages.
United States Patent and Trademark Office, "Notice of Allowance," issued in U.S. Appl. No. 13/997,266, dated Feb. 12, 2016, 5 pages.
Taiwanese Patent Office, "Search Report," issued in connection with Taiwan Application No. 102112332, dated May 24, 2016, with English translation, 2 pages.

(56) References Cited

OTHER PUBLICATIONS

Chinese Patent Office, "First Office Action and Search Report," issued in connection with Chinese Patent Application No. 201280071891.9 dated Jun. 4, 2015, with English translation, 19 pages.
Chinese Patent Office, "Notification of the First Office Action," issued in connection with Chinese Application No. 201180075926.1, dated Oct. 24, 2016, with English translation, 17 pages.
United States Patent and Trademark Office, "Notice of allowance," issued in U.S. Appl. No. 13/993,612, dated Apr. 15, 2016, 11 pages.
United States Patent and Trademark Office, "Final Office Action," issued in U.S. Appl. No. 13/993,612, dated Oct. 28, 2015, 13 pages.
United States Patent and Trademark Office, "Office Action," issued rn U.S. Appl. No. 13/993,612, dated May 7, 2015, 16 pages.
Chinese Patent Office, "First Office Action," issued in connection with Chinese Application No. 201380076325.1, dated Nov. 6, 2017, with English translation, 22 pages.
Morishima, S. el al.: "Face-to-face communicative avatar driven by voice", in Proc. 1999 IEEE Int. Cont. Image Processing (CD-ROM), pp. 11-15, vol. 3, Oct. 24, 1999, 5 pages.
Morishima, S.: "Face Analysis and Synthesis", IEEE Signal Processing Magazine, vol. 18, No. 3, pp. 26-34, May 2001, 9 pages.
International Searching Authority, "International Search Report and Written Opinion," issued in connection with PCT Application No. PCT/CN2013/000669, dated Mar. 13, 2014, 9 pages.
International Searching Authority, "International Search Report and Written Opinion," issued in connection with PCT Application No. PCT/CN2012/081061, dated Jun. 13, 2013, 14 pages.
International Searching Authority, "International Search Report and Written Opinion," issued in connection with PCT Application No. PCT/CN2011/072603, dated Oct. 27, 2011, 11 pages.
Stargreetz, retrieved from http://corp.stargreetz.com, retrieved on Apr. 4, 2013, pp. 1-2 as printed.
Tom's Messenger—Android Apps on Google Play, retrieved from https://play_google.com/store/apps/details?id=com_t>utfit7.tomsmessengerfree, retrieved on Apr. 4, 2013, pp. 1-2 as printed.
"WeChat—The New Way to Connect", retrieved from http://www.wechat.com/en/, retrieved on Apr. 4, 2013, pp. 1-2 as printed.
Blanz et al., "A Statistical Method for Robust 3D Surface Reconstruction from Sparse Data", Proceedings of 2nd International Symposium on 3D Data Processing, Visualization and Transmission, Sep. 6-9, 2004, 8 pages.
United States Patent and Trademark Office, "Non-Final Office Action," issued in connection with U.S. Appl. No. 14/127,457, dated Jun. 19, 2015, 9 pages.
United States Patent and Trademark Office, "Non-Final Office Action," issued in connection with U.S. Appl. No. 14/127,457, dated May 19, 2016, 11 pages.
United States Patent and Trademark Office, "Final Office Action," issued in connection with U.S. Appl. No. 14/127,457, dated Nov. 25, 2015, 12 pages.
United States Patent and Trademark Office, "Notice of Allowance," issued in connection with U.S. Appl. No. 14/127,457, dated Oct. 24, 2016, 5 pages.
International Bureau, "International Preliminary Report on Patentability and Written Opinion," issued in connection with PCT Application No. PCT/CN2013/000669, dated Dec. 8, 2015, 13 pages.
United States Patent and Trademark Office, "Non-Final Office Action," issued in connection with U.S. Appl. No. 15/450,295, dated Dec. 28, 2017, 7 pages.
Saragih et al., "Real-time Avatar Animation from a Single Image", In Automatic Face & Gesture Recognition and Workshops (FG 2011), 2011 IEEE International Conference, IEEE., 8 pages.
United States Patent and Trademark Office, "Final Office Action," issued in connection with U.S. Appl. No. 15/184,409, dated Jan. 25, 2018, 12 pages.
Taiwanese Office Action issued in Taiwan Application No. 106103271, dated Feb. 22, 2018, with English translation, 4 pages.
Taiwanese Office Action issued in Taiwan Application No. 106103276, dated Feb. 22, 2018, with English translation, 4 pages.
Taiwanese Office Action issued in Taiwanese Application No. 102112378, dated Mar. 27, 2018, with English translation, 5 pages.
Taiwanese Patent Office, "Office Action and Search Report," issued in connection with Taiwan Application No. 102112511, dated May 26, 2016, with English translation, 11 pages.
Taiwanese Patent Office, "Search Report," issued in connection with Taiwan Application No. 102112511, dated Mar. 15, 2017, with English translation of Search Report, 10 pages.
Taiwanese Patent Office, "Search Report," issued in connection with Taiwan Application No. 102112511, dated Dec. 27, 2017, with English translation of Search Report, 2 pages.
Chinese Patent Office, "First Office Action and Search Report," issued in connection with Chinese Application No. 201280071879.8, dated Jul. 26, 2016, with English translation, 36 pages.
Chinese Patent Office, "Second Office Action," issued in connection with Chinese Application No. 201280071879.8, dated Mar. 13, 2017, with English translation, 35 pages.
Chinese Patent Office, "Third Office Action," issued in connection with Chinese Application No. 201280071879.8, dated Jun. 16, 2017, with English translation, 38 pages.
Chinese Patent Office, "Decision on Rejection," issued in connection with Chinese Application No. 201280071879.8, dated Oct. 10, 2017, with English translation, 37 pages.
Chameides, et al., "Chemistry in the troposphere" Georgia Institute of Technology, Oct. 4, 1982, 15 pages.
Wang, et al., "Hydroxyl Radical Concentrations Measure of Ambient Air", Scientific Research Staff, Ford Motor Company, Dearborn, Michigan, May 6, 1975, 4 pages.
Chinese Patent Office, "First Office Action," issued in connection with Chinese Application No. 201280064807.0, dated Jul. 18, 2016, with English translation, 13 pages.
Chinese Patent Office, "Second Office Action," issued in connection with Chinese Application No. 201280064807.0, dated Mar. 21, 2017, with English translation, 14 pages.
Chinese Patent Office, "Notification of $2^{nd}$ Office Action," issued in connection with Chinese Application No. 201180075926.1, dated Mar. 29, 2017, with English translation, 20 pages.
International Bureau, "International Preliminary Report on Patentability and Written Opinion," issued in connection with PCT Patent Application No. PCT/CN2012/000458, dated Oct. 14, 2014, 8 pages.
International Bureau, "International Preliminary Report on Patentability and Written Opinion," issued in connection with PCT Patent Application No. PCT/CN2011/084902, dated Jul. 1, 2014, 5 pages.
International Bureau, "International Preliminary Report on Patentability and Written Opinion," issued in connection with PCT Patent Application No. PCT/CN2012/000459, dated Oct. 14, 2014, 6 pages.
International Bureau, "International Preliminary Report on Patentability and Written Opinion," issued in connection with PCT Patent Application No. PCT/CN2011/072603, dated Oct. 15, 2013, 7 pages.
United States Patent and Trademark Office, "Non-Final Office Action," issued in connection with U.S. Appl. No. 13/997,265, dated Jun. 29, 2015, 15 pages.
United States Patent and Trademark Office, "Final Office Action," issued in connection with U.S. Appl. No. 13/997,265, dated Feb. 5, 2016, 13 pages.
United States Patent and Trademark Office, "Non-Final Office Action," issued in connection with U.S. Appl. No. 13/997,265, dated May 24, 2016, 14 pages.
United States Patent and Trademark Office, "Final Office Action," issued in connection with U.S. Appl. No. 13/997,265, dated Sep. 22, 2016, 14 pages.
United States Patent and Trademark Office, "Non-Final Office Action," issued in connection with U.S. Appl. No. 13/997,265, dated Feb. 27, 2017, 14 pages.
United States Patent and Trademark Office, "Final Office Action," issued in connection with U.S. Appl. No. 13/997,265, dated Aug. 9, 2017, 16 pages.

(56) References Cited

OTHER PUBLICATIONS

United States Patent and Trademark Office, "Final Office Action," issued in connection with U.S. Appl. No. 15/395,657, dated Jul. 13, 2017, 10 pages.
United States Patent and Trademark Office, "Non-Final Office Action," issued in connection with U.S. Appl. No. 13/996,230, dated Feb. 4, 2015, 11 pages.
United States Patent and Trademark Office, "Final Office Action," issued in connection with U.S. Appl. No. 13/996,230, dated Jul. 15, 2015, 16 pages.
United States Patent and Trademark Office, "Non-Final Office Action," issued in connection with U.S. Appl. No. 13/996,230, dated Dec. 31, 2015, 15 pages.
United States Patent and Trademark Office, "Final Office Action," issued in connection with U.S. Appl. No. 13/996,230, dated Jun. 21, 2016, 18 pages.
United States Patent and Trademark Office, "Non-Final Office Action," issued in connection with U.S. Appl. No. 13/996,230, dated Oct. 3, 2016, 14 pages.
United States Patent and Trademark Office, "Final Office Action," issued in connection with U.S. Appl. No. 13/996,230, dated Feb. 10, 2017, 16 pages.
United States Patent and Trademark Office, "Non-Final Office Action," issued in connection with U.S. Appl. No. 15/184,409, dated Dec. 12, 2016, 18 pages.
United States Patent and Trademark Office, "Final Office Action," issued in connection with U.S. Appl. No. 15/184,409, dated Apr. 12, 2017, 18 pages.
United States Patent and Trademark Office, "Non-Final Office Action," issued in connection with U.S. Appl. No. 15/184,409, dated Jul. 6, 2017, 11 pages.
Chinese Patent Office, "Second Office Action," issued in connection with Chinese Application No. 201280071927.3, dated Jun. 14, 2017, with English translation, 18 pages.
Chinese Patent Office, "Third Office Action," issued in connection with Chinese Application No. 201280071927.3, dated Oct. 18, 2017, with English translation, 13 pages.
Chinese Patent Office, "Decision of Rejection," issued in connection with Chinese Application No. 201280075926.1, dated Aug. 30, 2017, with English translation, 16 pages.
United States Patent and Trademark Office, "Final Office Action," issued in connection with U.S. Appl. No. 15/395,661, dated Oct. 19, 2017, 10 pages.
Chinese Patent Office, "Decision on Rejection," issued in connection with Chinese Application No. 201280064807.0, dated Oct. 23, 2017, with English translation, 18 pages.
Taiwanese Patent Office, "Office Action and Search Report," issued in connection with Taiwan Application No. 106103271, dated Oct. 31, 2017, with English translation, 17 pages.
United States Patent and Trademark Office, "Non-Final Office Action," issued in connection with U.S. Appl. No. 15/643,984, dated Jan. 17, 2018, 17 pages.
Taiwanese Patent Office, "Office Action," issued in connection with Taiwanese Patent Application No. 102112378, dated Sep. 1, 2017, with English translation, 10 pages.
Tong et al., "Semiconductor Wafer Bonding: Science and Technology", The Electrochemical Society, Inc., 1999, 9 pages.
Taiwanese Patent Office, "Office Action and Search Report," issued in connection with Taiwan Application No. 106103276, dated Oct. 31, 2017, with English translation, 17 pages.
United States Patent and Trademark Office, "Non-Final Office Action," issued in connection with U.S. Appl. No. 15/124,811, dated Dec. 5, 2017, 14 pages.
United States Patent and Trademark Office, "Final Office Action," issued in connection with U.S. Appl. No. 15/124,811, dated May 2, 2018, 14 pages.
United States Patent and Trademark Office, "Non-Final Office Action," issued in connection with U.S. Appl. No. 15/124,811, dated Aug. 16, 2018, 15 pages.
United States Patent and Trademark Office, "Final Office Action," issued in connection with U.S. Appl. No. 15/124,811, dated Dec. 13, 2018, 16 pages.
United States Patent and Trademark Office, "Notice of Allowance," issued in connection with U.S. Appl. No. 15/124,811, dated Jul. 2, 2019, 12 pages.
The International Bureau, "International Preliminary Report on Patentability," issued in connection with application No. PCT/CN2015/097826, dated Jun. 19, 2018, 5 pages.
Thomas et al., "The Illusion of Life Disney Animation," Disney Publishing Worldwide, Oct. 19, 1995, 3 pages (Book, abstract only provided).
Wikipedia, "Twelve Basic Principles of Animation," https://en.wikipedia.org/wiki/Twelve_basic_principles_of_animation, last edited on Jan. 13, 2021, retrieved on Feb. 12, 2021, 8 pages.
Chinese Reexamination Notice issued in Chinese Application No. 201710032311.X, dated May 7, 2021, 19 pages.
Dragos Stanculescu, FaccRig Guide v1.0, Jul. 7, 2015, 35 pages.
National Intellectual Property Administration, P.R. China, "Second Office Action," issued in connection with Application No. 201710032311.X, dated May 28, 2020, 20 pages.
khttp://msdn.microsoft.com/en-us/I ibrary/d n 782034 .aspx> "Face Tracking", Oct. 8, 2019, 3 pgs.
International Searching Authority, "International Search Report and Written Opinion," issued in connection with application No. PCT/CN2015/097826, dated Sep. 22, 2016, 8 Pages.
Chinese Patent Office, "Decision of Reexamination," issued in connection with Chinese Application No. 201710032311.X, dated Sep. 9, 2021, 39 pages.
International Searching Authority, "International Search Report and Written Opinion," issued in connection with application No. PCT/CN2014/094602, dated Sep. 22, 2015, 8 Pages.
International Searching Authority, "International Search Report and Written Opinion," issued in connection with application No. PCT/CN2014/094618, dated Sep. 24, 2015, 8 Pages.
International Searching Authority, "International Search Report and Written Opinion," issued in connection with application No. PCT/CN2014/094622, dated Sep. 29, 2015, 7 Pages.
Ghimire et al., "Geometric Feature-Based Facial Expression Recognition in Image Sequences Using Multi-Class AdaBoost and Support Vector Machines," Jun. 14, 2013, 21 pages.
Shenzhen Lianmeng Technology Co. Ltd., "FaceQ," Oct. 17, 2014, 1 page.
Itunes Preview Outfit 7, "Talking Tom Cat 2," May 27, 2011, 2 pages.
Cao et al. "Displaced Dynamic Expression Regression for Realtime Facial Tracking and Animation,", 10 pages.
Garrido et al., "Reconstructing Detailed Dynamic Face Geometry from Monocular Video," 2013. 3 pages.
Ruiz et al., "DoubleFlip: A Motion Gesture Delimiter for Mobile Interaction," CHI 2011 • Session: Interaction on Mobile Devices, May 7, 2011, 4 pages.
Wang et al., "Action Recognition by Dense Trajectories," IEEE Conference on Computer Vision & Pattern Recognition, Jun. 2011, Colorado Springs, United States, pp. 3169-3176, 9 pages.
Xiong et al., "Supervised Descent Method and its Applications to Face Alignment," 8 pages.
Zhang et al., "Coarse-to-Fine Auto-Encoder Networks (CFAN) for Real-Time Face Alignment," Key Lab of Intelligent Information Processing of Chinese Academy of Sciences (CAS), 16 pages.
Kim et al., "Facial Feature Extraction using PCE and Wavelet Multi-Resolution Images," Sixth IEEE International Conference on Automatic Face and Gesture Recognition, May 19, 2004, 3 pages. (Abstract Only).
U.S. Appl. No. 14/779,491, Preliminary Amendment dated Sep. 23, 2015, 7 pages.
U.S. Appl. No. 14/779,535, Preliminary Amendment dated Sep. 23, 2015, 7 pages.
United States Patent and Trademark Office, "Non-Final Office Action," issued in connection with U.S. Appl. No. 14/779,535, dated Dec. 27, 2016, 32 pages.

(56) References Cited

OTHER PUBLICATIONS

United States Patent and Trademark Office, "Non-Final Office Action," issued in connection with U.S. Appl. No. 14/779,491, dated Nov. 10, 2016, 22 pages.
U.S. Appl. No. 14/779,491, Response filed Feb. 8, 2017 to Non Final Office Action dated Nov. 10, 2016, 12 pags.
United States Patent and Trademark Office, "Final Office Action," issued in connection with U.S. Appl. No. 14/779,501, dated May 5, 2017, 23 pages.
United States Patent and Trademark Office, "Non-Final Office Action," issued in connection with U.S. Appl. No. 14/779,501, dated Dec. 9, 2016, 34 pages.
United States Patent and Trademark Office, "Notice of Allowance and Fee(s) Due," issued in connection with U.S. Appl. No. 14/779,501, dated Jul. 19, 2017, 22 pages.
United States Patent and Trademark Office, "Final Office Action," issued in connection with U.S. Appl. No. 15/822,271, dated Jul. 26, 2018, 22 pages.
United States Patent and Trademark Office, "Notice of Allowance and Fee(s) Due," issued in connection with U.S. Appl. No. 14/779,491, dated Jul. 11, 2017, 18 pages.
United States Patent and Trademark Office, "Final Office Action," issued in connection with U.S. Appl. No. 14/779,491, dated Mar. 22, 2017, 22 pages.
U.S. Appl. No. 14/779,491, Response filed Jun. 23, 2017 to Final Office Action dated Mar. 22, 2017, 11 pags.
United States Patent and Trademark Office, "Notice of Allowance and Fee(s) Due," issued in connection with U.S. Appl. No. 14/779,535, dated Jun. 15, 2017, 8 pages.
U.S. Appl. No. 14/779,535, Response filed Apr. 27, 2017 to Non Final Office Action dated Dec. 27, 2016, 12 pags.
Sucontphunt et al. "Interactive 3D Facial Expression Posing Through 2D Portrain Manipulation," Graphics Interface Conference, (2008), 177-184 pgs, 8 pages.
United States Patent and Trademark Office, "Applicant Initiated Interview Summary," issued in connection with U.S. Appl. No. 14/779,501, dated Mar. 1, 2017, 5 pages.
U.S. Appl. No. 14/779,501, Preliminary Amendment Sep. 23, 2015, 7 pages.
United States Patent and Trademark Office, "Non-Final Office Action," issued in connection with U.S. Appl. No. 16/655,686, dated Nov. 16, 2020, 17 pages.
United States Patent and Trademark Office, "Final Office Action," issued in connection with U.S. Appl. No. 16/655,686, dated May 18, 2021, 22 pages.
United States Patent and Trademark Office, "Final Office Action," issued in connection with U.S. Appl. No. 16/172,664, dated Jul. 10, 2019, 21 pages.
United States Patent and Trademark Office, "Non Final Office Action," issued in connection with U.S. Appl. No. 16/172,664, dated Dec. 27, 2019, 19 pages.
United States Patent and Trademark Office, "Notice of Allowance and Fee(s) Due," issued in connection with U.S. Appl. No. 16/172,664, dated Apr. 8, 2020, 7 pages.
United States Patent and Trademark Office, "Non-Final Office Action," issued in connection with U.S. Appl. No. 15/184,355, dated Jun. 26, 2018, 15 pages.
Welbergen et al., "Real Time Animation of Virtual Humans: A Trade-off Between Naturalness and Control," STAR—State of The Art Report, 2009, 28 pages.
Zhang et al. "Dynamic Facial Expression Analysis and Synthesis With MPEG-4 Facial Animation Parameters," IEEE Transaction on Circuits and Sysrtems for Video Technology, vol. 18, No. 10, Oct. 2008, 15 pages.
Badler et al., "Representing and Parameterizing Agent Behaviors", 2002 IEEE. Reprinted from Proceedings of Computer Animation 2002 (CA 2002), pp. 133-143, Jun. 2002, 13 pages.
Egges et al., "Personalised Real-Time Idle Motion Synthesis," Pacific Conference on Computer Graphics and Applications (PG 2004), Oct. 6-8, 2004, 12 pages.

European Patent Office, "Extended European Search Report," issued in connection with European patent application No. 18180580.5, dated Sep. 10, 2018, 14 pages.
European Patent Office, "Extended European Search Report," issued in connection with European patent application No. 14908703.3, dated Aug. 7, 2018, 13 pages.
United States Patent and Trademark Office, "Non-Final Office Action," issued in connection with U.S. Appl. No. 15/791,222, dated Apr. 19, 2018, 26 pages.
United States Patent and Trademark Office, "Final Office Action," issued in connection with U.S. Appl. No. 15/791,222, dated Oct. 5, 2018, 14 pages.
United States Patent and Trademark Office, "Non-Final Office Action," issued in connection with U.S. Appl. No. 15/791,222, dated Jan. 28, 2019, 13 pages.
United States Patent and Trademark Office, "Final Office Action," issued in connection with U.S. Appl. No. 15/791,222, dated May 31, 2019, 16 pages.
United States Patent and Trademark Office, "Notice of Allowance and Fee(s) Due," issued in connection with U.S. Appl. No. 15/791,222, dated Sep. 18, 2019, 5 pages.
Taiwanese Office Action issued in Taiwanese Application No. 109121460, dated Nov. 4, 2021, 1 page.
International Searching Authority, "International Search Report and Written Opinion," issued in connection with PCT application No. PCT/CN2015/085556, dated May 4, 2016, 6 pages.
International Searching Authority, "International Preliminary Report on Patentability," issued in connection with PCT application No. PCT/CN2015/085556, dated Jan. 30, 2018, 4 pages.
United States Patent and Trademark Office, "Non-Final Office Action," issued in connection with U.S. Appl. No. 15/102,200, dated Oct. 31, 2017, 13 pages.
United States Patent and Trademark Office, "Final Office Action," issued in connection with U.S. Appl. No. 15/102,200, dated Jun. 1, 2018, 12 pages.
United States Patent and Trademark Office, "Notice of Allowance and Fee(s) Due," issued in connection with U.S. Appl. No. 15/102,200, dated Aug. 29, 2018, 9 pages.
United States Patent and Trademark Office, "Non-Final Office Action," issued in connection with U.S. Appl. No. 16/241,937, dated Jun. 25, 2019, 17 pages.
United States Patent and Trademark Office, "Final Office Action," issued in connection with U.S. Appl. No. 16/241,937, dated Sep. 27, 2019, 14 pages.
United States Patent and Trademark Office, "Non-Final Office Action," issued in connection with U.S. Appl. No. 16/241,937, dated Feb. 10, 2020, 15 pages.
United States Patent and Trademark Office, "Corrected Notice of Allowability," issued in connection with U.S. Appl. No. 16/241,937, dated Jul. 27, 2020, 2 pages.
Japanese Patent Office, "Notice of Reasons for Refusal," issued in connection with Japanese patent application No. 2017-554362, dated Sep. 24, 2019, 7 pages (English Translation Included).
Japanese Patent Office, "Notice of Reasons for Refusal," issued in connection with Japanese patent application No. 2017-554362, dated Jun. 9, 2020, 7 pages (English Translation Included).
Japanese Patent Office, "Notice of Allowance," issued in connection with Japanese patent application No. 2017-554362, dated Oct. 20, 2020, 2 pages (English Translation Not Included).
European Patent Office, "Extended European Search Report," issued in connection with European patent application No. 15899301.4, dated Feb. 28, 2019, 8 pages.
European Patent Office, "Communication Pursuant to Rules 70(2) and 70a (2) EPC," issued in connection with European patent application No. 15899301.4, dated Mar. 19, 2019, 1 pages.
International Searching Authority, "International Preliminary Report on Patentability and Written Opinion," issued in connection with PCT application No. PCT/CN2014/094622, dated Jun. 27, 2017, 10 pages.
Chinese Patent Office, "First Office Action," issued in connection with Chinese patent application No. 201480083627,6, dated Jan. 19, 2020, 19 pages. (English Translation Included).

(56) References Cited

OTHER PUBLICATIONS

Chinese Patent Office, "Second Office Action," issued in connection with Chinese patent application No. 201480083627,6, dated Jul. 3, 2020, 5 pages. (English Translation Included).

Chinese Patent Office, "Decision on Rejection," issued in connection with Chinese patent application No. 201480083627,6, dated Mar. 2, 2021, 4 pages. (English Translation Included).

Chinese Patent Office, "Fourth Office Action," issued in connection with Chinese patent application No. 201480083627,6, dated Aug. 27, 2021, 7 pages. (English Translation Not Included).

United States Patent and Trademark Office, "Corrected Notice of Allowability," issued in connection with U.S. Appl. No. 16/241,937, dated Jun. 26, 2020, 2 pages.

United States Patent and Trademark Office, "Notice of Allowance and Fee(s) Due," issued in connection with U.S. Appl. No. 16/241,937, dated May 15, 2020, 10 pages.

United States Patent and Trademark Office, "Advisory Action," issued in connection with U.S. Appl. No. 16/241,937, dated Nov. 22, 2019, 2 pages.

Chinese Patent Office, "Decision of Reexamination," issue don connection with Chinese patent application No. 201710032311.X dated Sep. 9, 2021, 39 pages. (English Translation Not Included).

Taiwanese Office Action issued in Taiwanese Application No. 10520649720, dated May 26, 2016, with English translation, 14 pages.

Taiwanese Office Action issued in Taiwanese Application No. 10621111180, dated Oct. 31, 2017, with English translation, 32 pages.

Taiwanese Office Action issued in Taiwanese Application No. 10820754290, dated Aug. 8, 2019, with English translation, 41 pages.

United States Patent and Trademark Office, "Final Office Action," issued in connection with U.S. Appl. No. 15/184,355, dated Dec. 21, 2018, 14 pages.

United States Patent and Trademark Office, "Advisory Action," issued in connection with U.S. Appl. No. 16/655,686, dated Sep. 10, 2021, 3 pages.

United States Patent and Trademark Office, "Notice of Allowance and Fee(s) Due," issued in connection with U.S. Appl. No. 16/987,707, dated Sep. 20, 2021, 6 pages.

United States Patent and Trademark Office, "Non-Final Office Action," issued in connection with U.S. Appl. No. 16/987,707, dated May 27, 2021, 25 pages.

United States Patent and Trademark Office, "Final Office Action," issued in connection with U.S. Appl. No. 15/395,661, dated Nov. 2, 2018, 13 pages.

United States Patent and Trademark Office, "Final Office Action," issued in connection with U.S. Appl. No. 15/643,984, dated Jun. 27, 2018, 16 pages.

United States Patent and Trademark Office, "Non Final Office Action," issued in connection with U.S. Appl. No. 16/655,686, dated Dec. 15, 2021, 25 pages.

United States Patent and Trademark Office, "Notice of Allowance and Fee(s) Due," issued in connection with U.S. Appl. No. 16/987,707, dated Dec. 7, 2021, 6 pages.

\* cited by examiner

COMMUNICATION USING INTERACTIVE AVATARS

RELATED APPLICATIONS

This patent arises from a continuation of U.S. application Ser. No. 16/453,507, titled "Communication Using Interactive Avatars," filed Jun. 26, 2019, which is a continuation of U.S. application Ser. No. 15/395,580 (now abandoned), titled "Communication Using Interactive Avatars," filed Dec. 30, 2016, which is a continuation of U.S. application Ser. No. 15/184,355 (now abandoned), titled "Communication Using Interactive Avatars," filed Jun. 16, 2016, which is a continuation of U.S. application Ser. No. 13/996,009 (now U.S. Pat. No. 9,386,268), titled "Communication Using Interactive Avatars," filed Feb. 20, 2014, which is a National Stage Entry of International Application PCT/CN2012/000458, titled "Communication Using Interactive Avatars," filed Apr. 9, 2012. U.S. application Ser. No. 16/453,507; U.S. application Ser. No. 15/395,580; U.S. application Ser. No. 15/184,355; U.S. application Ser. No. 13/996,009; and PCT/CN2012/000458 are hereby incorporated by this reference in their entireties.

FIELD

The following disclosure relates to video communication, and, more particularly, to video communication using interactive avatars.

BACKGROUND

The increasing variety of functionality available in mobile devices has spawned a desire for users to communicate via video in addition to simple calls. For example, users may initiate "video calls," "videoconferencing," etc., wherein a camera and microphone in a device captures audio and video of a user that is transmitted in real-time to one or more other recipients such as other mobile devices, desktop computers, videoconferencing systems, etc. The communication of video may involve the transmission of substantial amounts of data (e.g., depending on the technology of the camera, the particular video codec employed to process the captured image data, etc.). Given the bandwidth limitations of existing 2G/3G wireless technology, and the still finite bandwidth of emerging 4G wireless technology, many device users conducting concurrent video calls may exceed available bandwidth in the existing wireless communication infrastructure, which may impact negatively on the quality of the video call.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
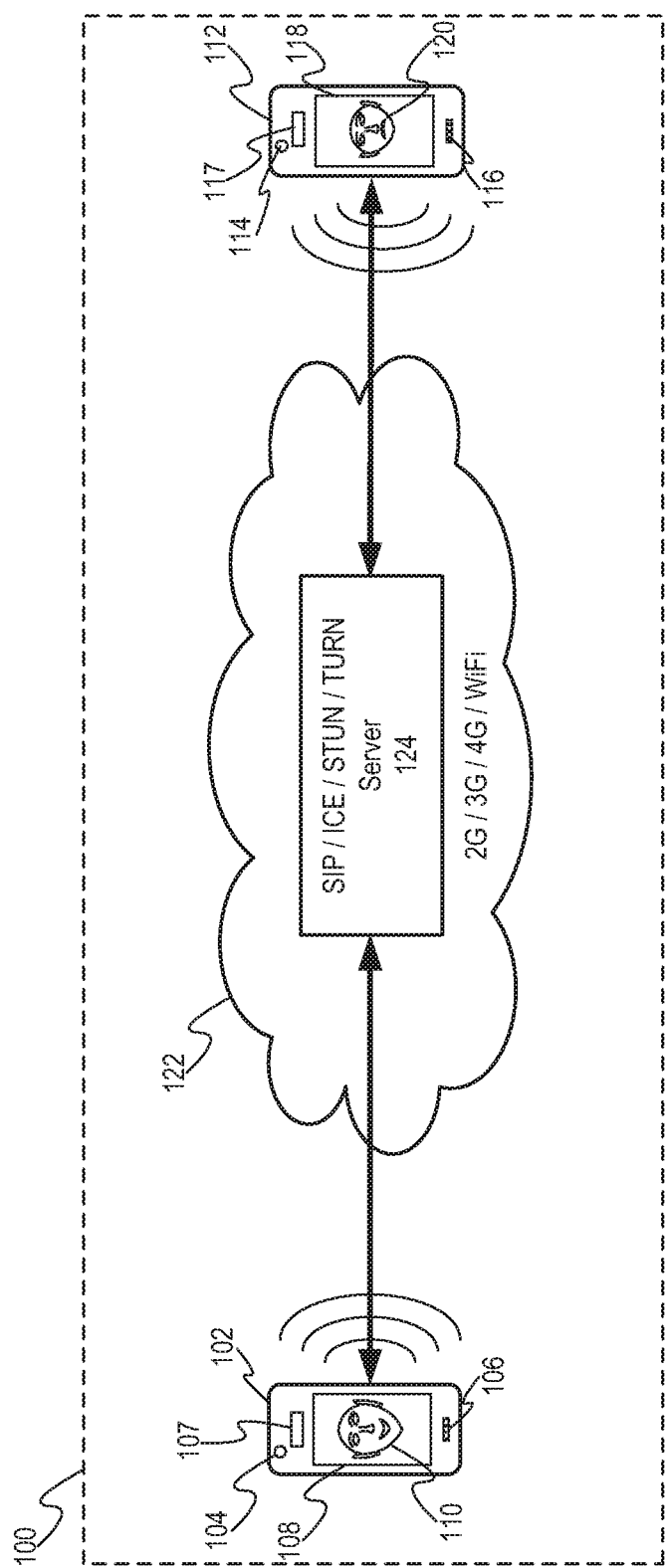
FIG. 1A illustrates an example device-to-device system in accordance with various embodiments of the present disclosure.

Although the following Detailed Description will proceed with reference being made to illustrative embodiments, many alternatives, modifications and variations thereof will be apparent to those skilled in the art.

DETAILED DESCRIPTION

Generally, this disclosure describes systems and methods for video communication using interactive avatars. Using avatars, as opposed to live images, substantially reduces the amount of data to be transmitted, and thus, the avatar communication requires less bandwidth. Interactive avatars are configured to enhance the user experience by modifying display of a selected avatar based on a user input. Further, user speech may be captured and transformed to generate avatar speech. Avatar speech may then be related to user speech but may mask the identity of the user. Audio transformations may include, e.g., pitch shifting and/or time stretching.

In one embodiment an application is activated in a device coupled to a camera, a microphone and a speaker. The application may be configured to allow a user to select an avatar for display on a remote device, in a virtual space, etc. The device may then be configured to initiate communication with at least one other device, a virtual space, etc. For example, the communication may be established over a 2G, 3G, 4G cellular connection. Alternatively or additionally, the communication may be established over the Internet via a WiFi connection. After the communication is established, the camera may be configured to start capturing images and/or distance(s) to an object and the microphone may be configured to start capturing sound, e.g., user speech, and converting the user speech into a user speech signal.

Whether a user input is detected may then be determined. The user input may be captured by a user input device. User inputs include touch events captured by a touch-sensitive display and gestures captured by a camera, e.g., a depth camera configured to capture distances to objects and/or a web camera. Thus, user input devices include touch-sensitive displays and/or cameras. If a user input is detected, the user input may be identified. For a touch event, a user input identifier may be related to a touch type and one or more touch locations. For a gesture (e.g., an open hand), a user input identifier may be related to a gesture identifier. An animation command may then be identified based on the user input. Animation commands correspond to a desired response associated with the user input, e.g., changing a color of a face of a displayed avatar in response to a single tap on the face of the displayed avatar.

Avatar parameters may then be generated. Avatar parameters may be generated based on facial detection, head movement and/or animation command(s). Avatar parameters may thus include passive components based on, e.g., facial detection and head movement, and interactive components based on animation command(s). Avatar parameters may be usable for animating the avatar on the at least one other device, within the virtual space, etc. In one embodiment, the avatar parameters may be generated based on facial detection, head movement and the animation command. In this embodiment, a resulting animation includes passive animation based on facial detection and head movement modified by interactive animation based on the animation command.

Thus, avatar animations may include passive animations based on, e.g., facial detection and head movement, and interactive animations based on user inputs.

At least one of an animation command and avatar parameters may then be transmitted. In one embodiment at least one of a remote animation command and remote avatar parameters are received. The remote animation command may cause the device to determine avatar parameters based on the remote animation command in order to animate a displayed avatar. The remote avatar parameters may cause the device to animate the displayed avatar based on the received remote avatar parameters.

Audio communication may accompany the avatar animation. After the communication is established, the microphone may be configured to capture audio input (sound), e.g., user speech, and convert the captured sound into a corresponding audio signal (e.g., user speech signal). In an embodiment, the user speech signal may be transformed into an avatar speech signal that may then be encoded and transmitted. Received avatar speech signal may then be converted back to sound (e.g., avatar speech) by a speaker. The avatar speech may thus be based on the user speech and may preserve content but may alter spectral data associated with the captured speech. For example, transformations include, but are not limited to, pitch shifting time stretching and/or converting playback rate.

The user input device (e.g., touch-sensitive display and/or camera) may be configured to capture user inputs configured to animate the avatar based on user inputs on at least one other device. The user-driven animations (based on animation command(s)) may be in addition to the animation based on facial expression and/or head movement. Animation commands may include, but are not limited to, changes in orientation of the display of the avatar, distortion of facial features, changing features to communicate emotion, etc. Animation commands may thus modify the avatar animation similar and/or in addition to animations based on facial detection/tracking. The animation commands may result in time-limited animations and may be based on input from a remote user with a resulting animation illustrated on a local user's displayed avatar.

Thus, a limited bandwidth video communication system may be implemented using avatars. Audio may be transformed and video may be animated based on detected user inputs and identified animation commands to enhance user experience with the avatar communication. Further, anonymity may be preserved using the avatars, including audio transformations as described herein.

FIG. 1A illustrates device-to-device system 100 consistent with various embodiments of the present disclosure. System 100 may generally include devices 102 and 112 communicating via network 122. Device 102 includes at least camera 104, microphone 106, speaker 107 and touch-sensitive display 108. Device 112 includes at least camera 114, microphone 116, speaker 117 and touch-sensitive display 118. Network 122 includes at least server 124.

Devices 102 and 112 may include various hardware platforms that are capable of wired and/or wireless communication. For example, devices 102 and 112 may include, but are not limited to, videoconferencing systems, desktop computers, laptop computers, tablet computers, smart phones, (e.g., iPhones®, Android®-based phones, Blackberries®, Symbian®-based phones, Palm®-based phones, etc.), cellular handsets, etc. Cameras 104 and 114 include any device for capturing digital images representative of an environment that includes one or more persons, and may have adequate resolution for face analysis and/or gesture recognition as described herein. For example, cameras 104 and 114 may include still cameras (e.g., cameras configured to capture still photographs) or a video cameras (e.g., cameras configured to capture moving images comprised of a plurality of frames). Cameras 104 and 114 may be configured to operate using light in the visible spectrum or with other portions of the electromagnetic spectrum not limited to the infrared spectrum, ultraviolet spectrum, etc. In one embodiment cameras 104 and 114 may be configured to detect depth, i.e., distance to an object and/or points on the object, from the camera. Cameras 104 and 114 may be incorporated within devices 102 and 112, respectively, or may be separate devices configured to communicate with devices 102 and 112 via wired or wireless communication. Specific examples of cameras 104 and 114 may include wired (e.g., Universal Serial Bus (USB), Ethernet, Firewire, etc.) or wireless (e.g., WiFi, Bluetooth, etc.) web cameras as may be associated with computers, video monitors, etc., depth cameras, mobile device cameras (e.g., cell phone or smart phone cameras integrated in, for example, the previously discussed example devices), integrated laptop computer cameras, integrated tablet computer cameras (e.g., iPad®, Galaxy Tab®, and the like), etc.

Devices 102 and 112 may further comprise microphones 106 and 116 and speakers 107 and 117. Microphones 106 and 116 include any devices configured to sense (i.e., capture) sound and convert sensed sound into a corresponding audio signal. Microphones 106 and 116 may be integrated within devices 102 and 112, respectively, or may interact with the devices via wired or wireless communication such as described in the above examples regarding cameras 104 and 114. Speakers 107 and 117 include any devices configured to convert audio signal(s) into corresponding sound. Speakers 107 and 117 may be integrated within devices 102 and 112, respectively, or may interact with the devices via wired or wireless communication such as described in the above examples regarding cameras 104 and 114. Touch-sensitive displays 108 and 118 include any devices configured to display text, still images, moving images (e.g., video), user interfaces, graphics, etc. and configured to sense touch events such as tap(s), swipe, etc. Touch event(s) may include touch type and touch location (s). Touch-sensitive displays 108 and 118 may be integrated within devices 102 and 112, respectively, or may interact with the devices via wired or wireless communication such as described in the above examples regarding cameras 104 and 114. In one embodiment, displays 108 and 118 are configured to display avatars 110 and 120, respectively. As referenced herein, an Avatar is defined as a graphical representation of a user in either two-dimensions (2D) or three-dimensions (3D). Avatars do not have to resemble the looks of the user, and thus, while avatars can be lifelike representations they can also take the form of drawings, cartoons, sketches, etc. In system 100, device 102 may display avatar 110 representing the user of device 112 (e.g., a remote user), and likewise, device 112 may display avatar 120 representing the user of device 102. In this way users may see a representation of other users without having to exchange the large amounts of information involved with device-to-device communication employing live images. Further, avatars may be animated based on a user input. In this manner the user may interact with the display of a local and/or remote avatar, thereby enhancing the user experience. The resulting animations may provide a broader range of animations than possible using only facial detection and tracking. Further, the user may actively select the animations.

As referenced herein, avatar audio (i.e., sound) is defined as transformed user audio (sound). For example, the sound input may include a user's voice, i.e., user speech, and the corresponding avatar audio may include transformed user's speech. Avatar audio may be related to user audio. For example, avatar speech may correspond to pitch-shifted, time-stretched and/or other transformations of user speech. Avatar speech may resemble human speech or may correspond to cartoon characters, etc. In system 100, device 102 may emit avatar audio representing the remote user of device 112 and similarly device 112 may emit avatar audio representing audio captured by device 102 (e.g., speech of local user of device 102). In this way, users may hear a representation of other users' voices that may be transformed.

Network 122 may include various second generation (2G), third generation (3G), fourth generation (4G) cellular-based data communication technologies, Wi-Fi wireless data communication technology, etc. Network 122 includes at least one server 124 configured to establish and maintain communication connections when using these technologies. For example, server 124 may be configured to support Internet-related communication protocols like Session Initiation Protocol (SIP) for creating, modifying and terminating two-party (unicast) and multi-party (multicast) sessions, Interactive Connectivity Establishment Protocol (ICE) for presenting a framework that allows protocols to be built on top of byte stream connections, Session Traversal Utilities for Network Access Translators, or NAT, Protocol (STUN) for allowing applications operating through a NAT to discover the presence of other NATs, IP addresses and ports allocated for an application's User Datagram Protocol (UDP) connection to connect to remote hosts, Traversal Using Relays around NAT (TURN) for allowing elements behind a NAT or firewall to receive data over Transmission Control Protocol (TCP) or UDP connections, etc.

Figure 1B:
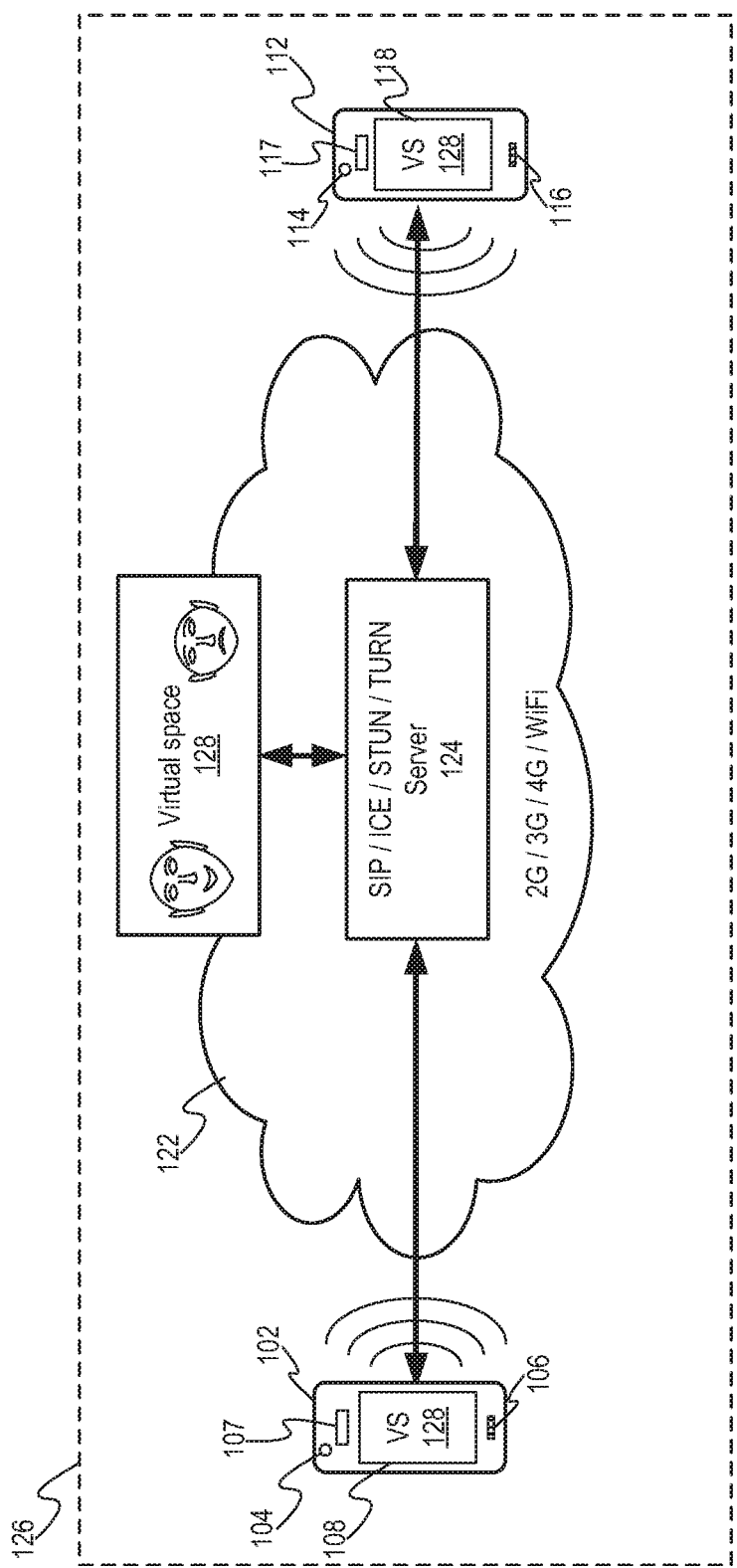
FIG. 1B illustrates an example virtual space system in accordance with various embodiments of the present disclosure.

FIG. 1B illustrates virtual space system 126 consistent with various embodiments of the present disclosure. System 126 may employ device 102, device 112 and server 124. Device 102, device 112 and server 124 may continue to communicate in the manner similar to that illustrated in FIG. 1A, but user interaction may take place in virtual space 128 instead of in a device-to-device format. As referenced herein, a virtual space may be defined as a digital simulation of a physical location. For example, virtual space 128 may resemble an outdoor location like a city, road, sidewalk, field, forest, island, etc., or an inside location like an office, house, school, mall, store, etc. Users, represented by avatars, may appear to interact in virtual space 128 as in the real world. Virtual space 128 may exist on one or more servers coupled to the Internet, and may be maintained by a third party. Examples of virtual spaces include virtual offices, virtual meeting rooms, virtual worlds like Second Life®, massively multiplayer online role-playing games (MMORPGs) like World of Warcraft®, massively multiplayer online real-life games (MMORLGs), like The Sims Online®, etc. In system 126, virtual space 128 may contain a plurality of avatars corresponding to different users. Instead of displaying avatars, displays 108 and 118 may display encapsulated (e.g., smaller) versions of virtual space (VS) 128. For example, display 108 may display a perspective view of what the avatar corresponding to the user of device 102 "sees" in virtual space 128. Similarly, display 118 may display a perspective view of what the avatar corresponding to the user of device 112 "sees" in virtual space 128. Examples of what avatars might see in virtual space 128 include, but are not limited to, virtual structures (e.g., buildings), virtual vehicles, virtual objects, virtual animals, other avatars, etc.

Figure 2:
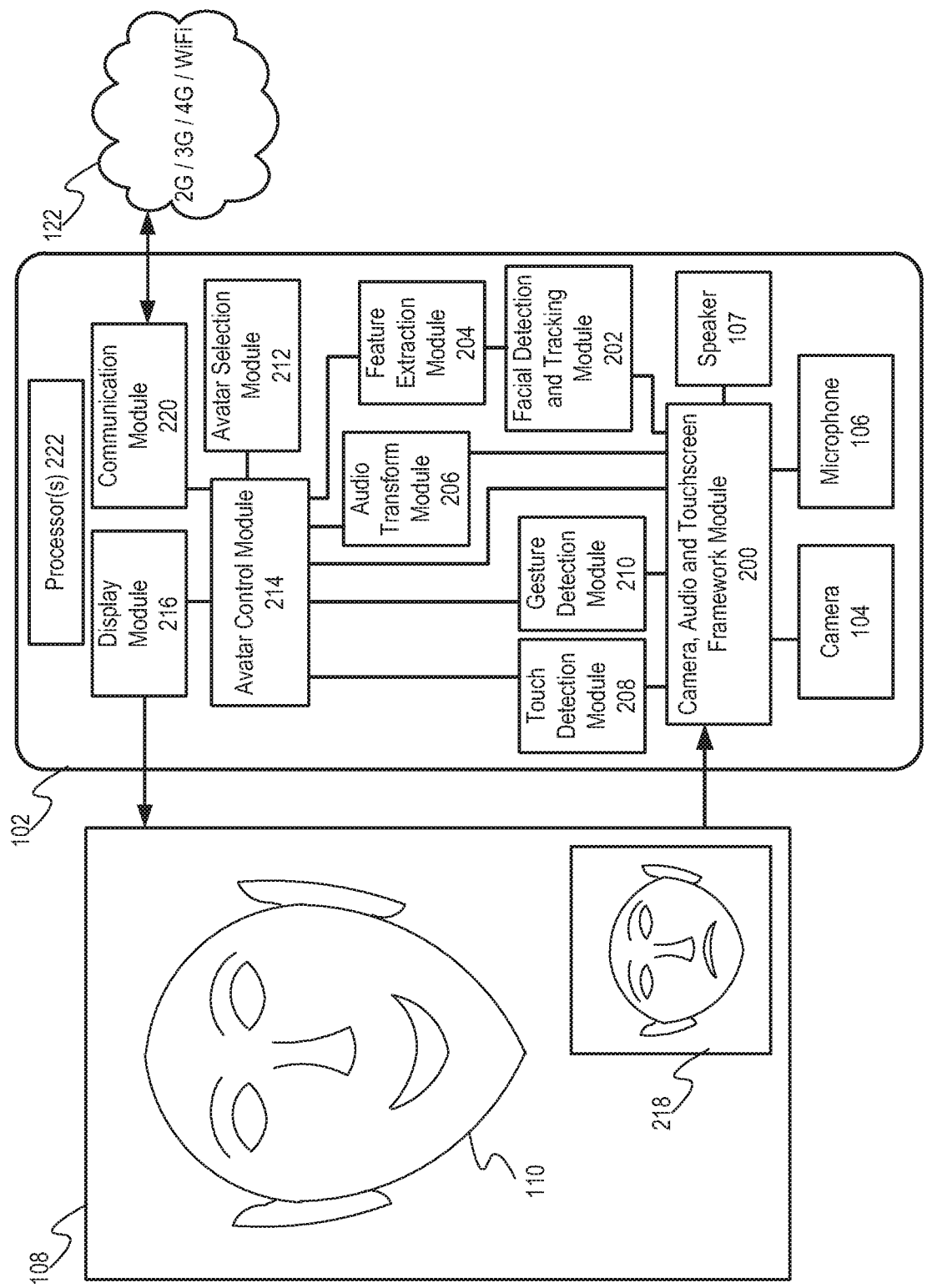
FIG. 2 illustrates an example device in accordance with various embodiments of the present disclosure.

FIG. 2 illustrates an example device 102 in accordance with various embodiments of the present disclosure. While only device 102 is described, device 112 (e.g., remote device) may include resources configured to provide the same or similar functions. As previously discussed, device 102 is shown including camera 104, microphone 106, speaker 107 and touch-sensitive display 108. Camera 104, microphone 106 and touch-sensitive display 108 may provide input to camera, audio and touch-screen framework module 200 and camera, audio and touch-screen framework module 200 may provide output (e.g., audio signal) to speaker 107. Camera, audio and touch-screen framework module 200 may include custom, proprietary, known and/or after-developed audio and video processing code (or instruction sets) that are generally well-defined and operable to control at least camera 104, microphone 106, speaker 107 and touch-sensitive display 108. For example, camera, audio and touch-screen framework module 200 may cause camera 104, microphone 106, speaker 107 and touch-sensitive display 108 to record images, distances to objects, sounds and/or touches, may process images, sounds, audio signal(s) and/or touches, may cause images and/or sounds to be reproduced, may provide audio signal(s) to speaker 107, etc. Camera, audio and touch-screen framework module 200 may vary depending on device 102, and more particularly, the operating system (OS) running in device 102. Example operating systems include iOS®, Android®, Blackberry® OS, Symbian®, Palm® OS, etc. Speaker 107 may receive audio information from camera, audio and touch-screen framework module 200 and may be configured to reproduce local sounds (e.g., to provide audio feedback of the user's voice, transformed or not) and remote sounds (e.g., the sound(s) of the other part(ies) (transformed or not) engaged in a telephone, video call or interaction in a virtual place).

Facial detection and tracking module 202 may be configured to identify and track a head, face and/or facial region within image(s) provided by camera 104. For example, facial detection module 204 may include custom, proprietary, known and/or after-developed face detection code (or instruction sets), hardware, and/or firmware that are generally well-defined and operable to receive a standard format image (e.g., but not limited to, a RGB color image) and identify, at least to a certain extent, a face in the image. Facial detection and tracking module 202 may also be configured to track the detected face through a series of images (e.g., video frames at 24 frames per second) and to determine a head position based on the detected face. Known tracking systems that may be employed by facial detection/tracking module 202 may include particle filtering, mean shift, Kalman filtering, etc., each of which may utilize edge analysis, sum-of-square-difference analysis, feature point analysis, histogram analysis, skin tone analysis, etc.

Feature extraction module 204 may be configured to recognize features (e.g., the location and/or shape of facial landmarks such as eyes, eyebrows, nose, mouth, etc.) in the face detected by face detection module 202. In one embodiment, avatar animation may be based directly on sensed facial actions (e.g., changes in facial features) without facial expression recognition. The corresponding feature points on an avatar's face may follow or mimic the movements of the real person's face, which is known as "expression clone" or "performance-driven facial animation." Feature extraction module 204 may include custom, proprietary, known and/or after-developed facial characteristics recognition code (or instruction sets) that are generally well-defined and operable to receive a standard format image (e.g., but not limited to a RGB color image) from camera 104 and to extract, at least to a certain extent, one or more facial characteristics in the image. Such known facial characteristics systems include, but are not limited to, the CSU Face Identification Evaluation System by Colorado State University.

Feature extraction module 204 may also be configured to recognize an expression associated with the detected features (e.g., identifying whether a previously detected face happy, sad, smiling, frown, surprised, excited, etc.)). Thus, feature extraction module 204 may further include custom, proprietary, known and/or after-developed facial expression detection and/or identification code (or instruction sets) that is generally well-defined and operable to detect and/or identify expressions in a face. For example, feature extraction module 204 may determine size and/or position of the facial features (e.g., eyes, mouth, cheeks, teeth, etc.) and may compare these facial features to a facial feature database which includes a plurality of sample facial features with corresponding facial feature classifications (e.g., smiling, frown, excited, sad, etc.).

Audio transform module 206 is configured to transform a user's voice into an avatar voice, i.e., a transformed user's voice. Transforming includes adjusting tempo (e.g., time stretching), pitch (e.g., pitch shifting) and playback rate. For example, audio transform module 206 may include custom, proprietary, known and/or after-developed audio transform code (or instruction sets) that are generally well-defined and operable to receive voice data representative of a user's voice and to convert the voice data to transformed voice data. The voice data may be related to an audio signal based on sound(s) captured by microphone 106 and processed by camera, audio and touchscreen framework module 200. Such known voice transforming systems include, but are not limited to, SoundTouch open-source audio processing library configured to adjust tempo, pitch and playback rates of audio streams or audio files.

Audio transform module 206 may include a plurality of predefined voice styles corresponding to transform parameters associated with transforming a user's voice. For example, the transform parameters may be configured to maintain human-sounding transformed voice output with a different pitch and/or tempo. Pitch may be shifted to a higher frequency for a female human or child-like voice, pitch may be shifted to a lower frequency for a male human voice, tempo may be adjusted up or down to increase or decrease speed of the speech, etc. In another example, the transform parameters may be configured to produce a transformed voice output that corresponds to an animal-like voice (e.g., cat) and/or a cartoon character type voice. This may be achieved by adjusting pitch, other frequency components and/or sampling parameters of the user speech.

A user may select a desired audio transform output prior to initiating a communication and/or may select a desired audio transform during the communication. Audio transform module 206 may be configured to provide a sample audio transform output in response to a request from the user. In an embodiment, audio transform module 206 may include a utility that allows a user to select audio transform parameters to produce a customized audio transform output. The utility may be configured to provide sample transformed audio output based on the user's voice input. The user may then adjust the audio transform parameters (e.g., by trial and error) until a suitable transform output is achieved. The audio transform parameters associated with the suitable output for the user may then be stored and/or utilized for avatar communication, as described herein.

Touch detection module 208 is configured to receive touch data from camera, audio and touch-screen framework module 200 and to identify the touch event based on the received touch data. The touch event identifier may include touch type and/or touch location(s). Touch type may include a single tap, a double tap, a tap and hold, a tap and move, a pinch and stretch, a swipe, etc. Touch location(s) may include a touch start location, a touch end location and/or intermediate moving touch locations, etc. The touch locations may correspond to coordinates of touch-sensitive display 108. Touch detection module 208 may include custom, proprietary, known and/or after-developed touch detection code (or instruction sets) that are generally well-defined and operable to receive touch data and to identify a touch event.

Gesture detection module 210 is configured to receive depth and/or image data from camera, audio and touch-screen framework module 200, to recognize a corresponding gesture based on the received depth and/or image data and to determine a gesture identifier based on the recognized gesture. Depth corresponds to distance from camera to an object. Gesture identifier is related to a recognized gesture. Gesture detection module 210 may include custom, proprietary, known and/or after-developed gesture detection code (or instruction sets) that are generally well-defined and operable to identify a gesture based on received depth and/or image data.

For example, gesture detection module 210 may include a database of predefined gestures. The predefined gestures may include at least some relatively common, relatively simple gestures, including open hand, closed hand (i.e., a fist), waving hand, making a circular motion with the hand, moving a hand from right to left, moving a hand from left to right, etc. Thus, gestures may include static, non-moving hand gestures, active moving hand gestures and/or combinations thereof. In an embodiment, gesture detection module 210 may include a training utility configured to allow a user to customize a predefined gesture and/or to train a new gesture. The customized gesture and/or the new gesture may then be associated with a gesture identifier and the gesture identifier may be associated with an animation command, as described herein. For example, the user may select an animation command to associate with the gesture from a predefined list of animation commands.

Thus, animation commands are related to desired response(s) to user inputs. An animation command may be associated with an identified user input, e.g., touch event identifier and/or gesture identifier. In this manner, a user may interact with a displayed avatar and/or may gesture in order to modify animation of the displayed avatar.

Avatar selection module 212 is configured to allow a user of device 102 to select an avatar for display on a remote device. Avatar selection module 212 may include custom, proprietary, known and/or after-developed user interface construction code (or instruction sets) that are generally well-defined and operable to present different avatars to a user so that the user may select one of the avatars. In one embodiment one or more avatars may be predefined in device 102. Predefined avatars allow all devices to have the same avatars, and during interaction only the selection of an avatar (e.g., the identification of a predefined avatar) needs to be communicated to a remote device or virtual space, which reduces the amount of information that needs to be exchanged. Avatars are selected prior to establishing communication, but may also be changed during the course of an active communication. Thus, it may be possible to send or receive an avatar selection at any point during the communication, and for the receiving device to change the displayed avatar in accordance with the received avatar selection.

Avatar control module 214 is configured to receive a user input identifier based on a user input to device 102. The user input identifier may include a touch event identifier determined by touch detection module 208 based on touch event data or a gesture identifier determined by gesture detection module 210. Touch event data includes touch type and touch location(s). The touch location(s) may correspond to coordinates associated with touch-sensitive display 108. The touch location(s) may be mapped to one or more point(s) on a displayed avatar, for example, to a feature, e.g., nose tip, mouth, lips, ear, eye, etc. The point(s) on the displayed avatar may be related to a desired response (i.e., animation command) of the avatar animation.

Avatar control module 214 is configured to determine an animation command based on a user input identifier (i.e., an identified user input). Animation command is configured to identify a desired avatar animation. For example, desired animations include changing a color of a displayed avatar's face, changing a size of a feature of the displayed avatar (e.g., making the nose larger), winking, blinking, smiling, removing a feature (e.g., an ear), etc. Thus, avatar control module 214 is configured to receive user input identifier and to determine an animation command based on the user input identifier.

Avatar control module 214 is configured to implement avatar animations based on the animation command(s). In an embodiment, for interactive animations displayed on a remote device, e.g., device 112, animation command(s) may be transmitted and the remote avatar control module may then implement the animation. In another embodiment, the avatar parameters may be transmitted configured for immediate implementation of the avatar animation.

The implemented interactive animations based on the animation commands may have a finite duration, after which the avatar animation may return to passive animations based on, e.g., facial detection and tracking as described herein. Implemented interactive animations that affect a size of a feature may be configured to gradually change size and to gradually return to an initial size. Additionally or alternatively, animations that affect a size of a feature may be configured to have an effect gradient. In other words, a relative magnitude of a change in size may be dependent on a location relative to, for example, a key vertex. Points on a displayed avatar closer to the key vertex may experience a greater change than points on the displayed avatar relatively more distant.

Thus, avatar control module 214 may receive user input identifier based on a user input, may determine an animation command based on the user input identifier and may implement animation based on the animation command. The interactive animations based on the animation command may be time-limited to a time period (duration) and/or may include an effect gradient. The animations may return to passive avatar animation based on facial detection and tracking after the time period.

Avatar control module 214 is configured to generate parameters for animating an avatar. Animation, as referred to herein, may be defined as altering the appearance of an image/model. Animation includes passive animation based on, e.g., facial expression and/or head movement and interactive animation based on a user input. A single animation (that may include passive and interactive animation) may alter the appearance of a 2-D still image, or multiple animations may occur in sequence to simulate motion in the image (e.g., head turn, nodding, blinking, talking, frowning, smiling, laughing, winking, blinking, etc.) An example of animation for 3-D models includes deforming a 3-D wireframe model, applying a texture mapping, and re-computing the model vertex normal for rendering. A change in position of the detected face and/or extracted facial features may be converted into parameters that cause the avatar's features to resemble the features of the user's face. In one embodiment the general expression of the detected face may be converted into one or more parameters that cause the avatar to exhibit the same expression. The expression of the avatar may also be exaggerated to emphasize the expression. Knowledge of the selected avatar may not be necessary when avatar parameters may be applied generally to all of the predefined avatars. However, in one embodiment avatar parameters may be specific to the selected avatar, and thus, may be altered if another avatar is selected. For example, human avatars may require different parameter settings (e.g., different avatar features may be altered) to demonstrate emotions like happy, sad, angry, surprised, etc. than animal avatars, cartoon avatars, etc.

Avatar control module 214 may include custom, proprietary, known and/or after-developed graphics processing code (or instruction sets) that are generally well-defined and operable to generate parameters for animating the avatar selected by avatar selection module 212 based on the face/head position detected by facial detection and tracking module 202, the facial features detected by feature extraction module 204 and/or user input identifier determined by touch detection module 208 and/or gesture detection module 210. For facial feature-based animation methods, 2-D avatar animation may be done with, for example, image warping or image morphing, whereas 3-D avatar animation may be done with free form deformation (FFD) or by utilizing the animation structure defined in a 3-D model of a head. Oddcast is an example of a software resource usable for 2-D avatar animation, while FaceGen is an example of a software resource usable for 3-D avatar animation.

For example, for an interactive animation that includes lengthening a nose of a 3-D avatar display, a key vertex $v_k$ may be defined (e.g., selected) related to a tip of the nose. An associated 3-D motion vector $d_k$ (dx, dy, dz) and an effect radius R may be defined for the key vertex $v_k$. Other vertices within the effect radius R may change (i.e., move) in the interactive animation while vertices outside the effect radius R may remain unchanged by the interactive animation. The interactive animation may have an associated duration, animation time T, that may extend for a plurality of frames. A temporal effect parameter, $\eta_t$, may be defined, based on time, t, and animation time, T, as:

$$\eta_t = \begin{cases} t/T, & 0 \le t < T \\ 2 - t/T, & T \le t < 2T \\ 0, & \text{otherwise} \end{cases}$$

Vertices within the effect radius R that are relatively closer to $v_k$ may change relatively greater than vertices that are relatively farther from the key vertex $v_k$. A spatial effect parameter, $\eta_i$, for a vertex, $v_i$, may be defined as:

$$\eta_i = \exp\left(-\frac{\|v_k - v_i\|^2}{R^2}\right)$$

and a motion vector $d_i^t$ of a vertex $v_i$ at a time t may then be defined as $d_i^t = \eta_t \cdot \eta_i \cdot d_k$. A new coordinate of the interactive animated avatar is then $v_i^t = v_i^0 + d_i^t$, where $v_i^0$ corresponds to the coordinate of vertex $v_i$ based on facial detection and tracking, i.e., passive animation.

Thus, an animation may be implemented for a displayed avatar that includes interactive animation modifying passive animation. The interactive animation may be limited in overall duration and a magnitude of the effect of the animation may vary within the duration. The interactive animation may be configured to affect only a portion of an avatar and the effects may be greater for points nearer a key vertex. After the interactive animation has completed, animation may continue based on facial detection and tracking, as described herein.

In addition, in system 100 avatar control module 214 may receive a remote avatar selection and remote avatar parameters usable for displaying and animating an avatar corresponding to a user at a remote device. The animations may include passive animations as well as interactive animations. Avatar control module may cause display module 216 to display avatar 110 on display 108. Display module 216 may include custom, proprietary, known and/or after-developed graphics processing code (or instruction sets) that are generally well-defined and operable to display and animate an avatar on display 108 in accordance with the example device-to-device embodiment. For example, avatar control module 214 may receive a remote avatar selection and may interpret the remote avatar selection to correspond to a predetermined avatar. Display module 216 may then display avatar 110 on display 108. Moreover, remote avatar parameters received in avatar control module 214 may be interpreted, and commands may be provided to display module 216 to animate avatar 110. In one embodiment more than two users may engage in the video call. When more than two users are interacting in a video call, display 108 may be divided or segmented to allow more than one avatar corresponding to remote users to be displayed simultaneously. Alternatively, in system 126 avatar control module 214 may receive information causing display module 216 to display what the avatar corresponding to the user of device 102 is "seeing" in virtual space 128 (e.g., from the visual perspective of the avatar). For example, display 108 may display buildings, objects, animals represented in virtual space 128, other avatars, etc.

In one embodiment avatar control module 214 may be configured to cause display module 216 to display "feedback" avatar 218. Feedback avatar 218 represents how the selected avatar appears on the remote device, in a virtual place, etc. In particular, feedback avatar 218 appears as the avatar selected by the user and may be animated using the same parameters generated by avatar control module 214. In this way the user may confirm what the remote user is seeing during their interaction. Feedback avatar 218 may also be used to display interactive animations caused by remote user's inputs to device 112. Thus, a local user may interact with his or her feedback avatar (e.g., avatar 218 and user of device 102) to cause interactive animation of his or her associated avatar displayed to a remote user on device 112. The local user may similarly interact with remote user's displayed avatar (e.g., avatar 110) to cause interactive animation of remote user's feedback avatar displayed on device 112.

Communication module 220 is configured to transmit and receive information for selecting avatars, displaying avatars, animating avatars, displaying virtual place perspective, etc. Communication module 220 may include custom, proprietary, known and/or after-developed communication processing code (or instruction sets) that are generally well-defined and operable to transmit avatar selections, avatar parameters, animation command, interactive avatar parameters and receive remote avatar selections, remote avatar parameters, remote animation command and remote interactive avatar parameters. Communication module 220 may also transmit and receive audio information corresponding to avatar-based interactions. Communication module 220 may transmit and receive the above information via network 122 as previously described.

Processor(s) 222 are configured to perform operations associated with device 102 and one or more of the modules included therein.

Figure 3:
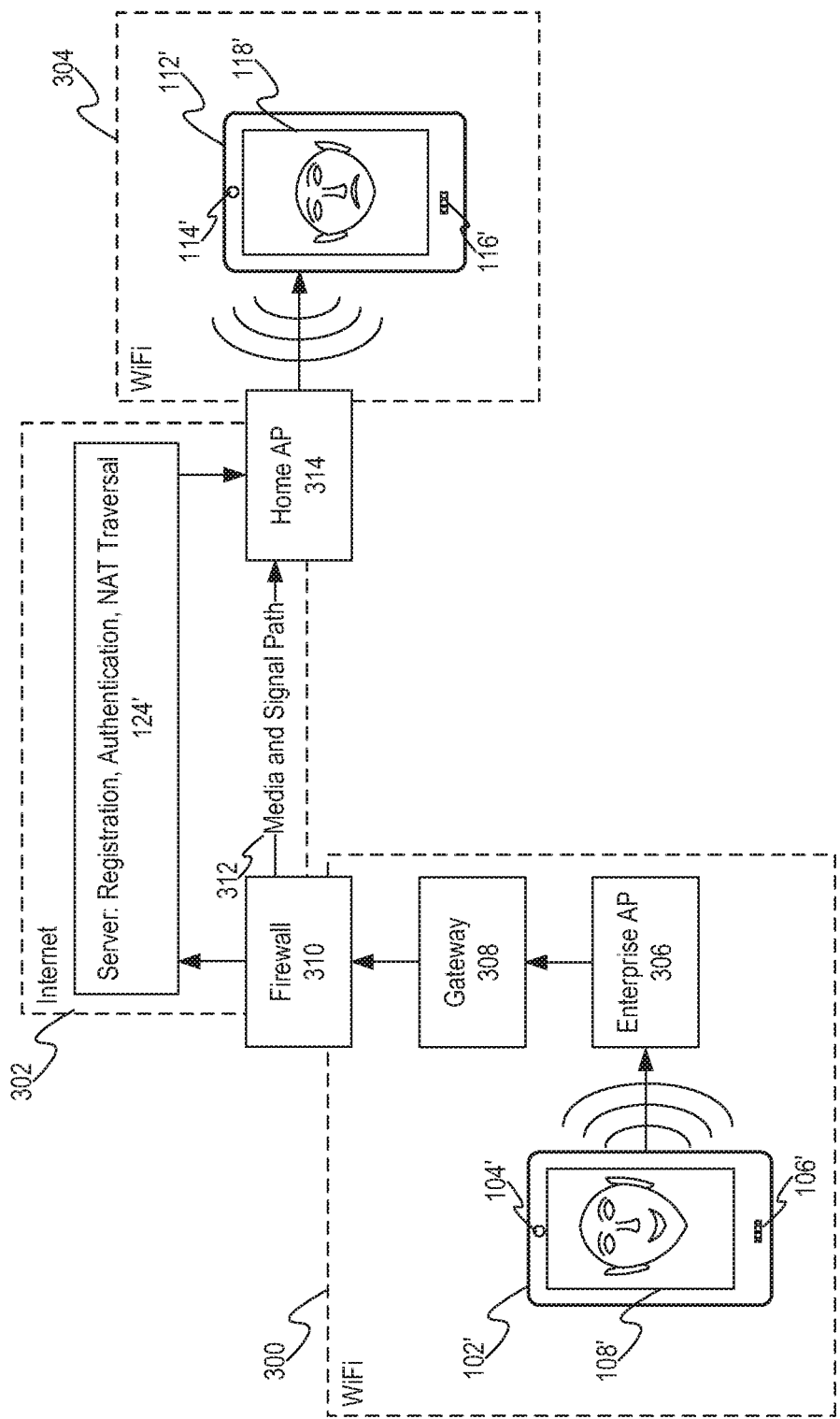
FIG. 3 illustrates an example system implementation in accordance with at least one embodiment of the present disclosure.

FIG. 3 illustrates an example system implementation in accordance with at least one embodiment. Device 102' is configured to communicate wirelessly via WiFi connection 300 (e.g., at work), server 124' is configured to negotiate a connection between devices 102' and 112' via Internet 302, and apparatus 112' is configured to communicate wirelessly via another WiFi connection 304 (e.g., at home). In one embodiment a device-to-device avatar-based video call application is activated in apparatus 102'. Following avatar selection, the application may allow at least one remote device (e.g., device 112') to be selected. The application may then cause device 102' to initiate communication with device 112'. Communication may be initiated with device 102' transmitting a connection establishment request to device 112' via enterprise access point (AP) 306. Enterprise AP 306 may be an AP usable in a business setting, and thus, may support higher data throughput and more concurrent wireless clients than home AP 314. Enterprise AP 306 may receive the wireless signal from device 102' and may proceed to transmit the connection establishment request through various business networks via gateway 308. The connection establishment request may then pass through firewall 310, which may be configured to control information flowing into and out of the WiFi network 300.

The connection establishment request of device 102' may then be processed by server 124'. Server 124' may be configured for registration of IP addresses, authentication of destination addresses and NAT traversals so that the connection establishment request may be directed to the correct destination on Internet 302. For example, server 124' may resolve the intended destination (e.g., remote device 112') from information in the connection establishment request received from device 102', and may route the signal to through the correct NATs, ports and to the destination IP address accordingly. These operations may only have to be performed during connection establishment, depending on the network configuration. In some instances operations may be repeated during the video call in order to provide notification to the NAT to keep the connection alive. Media and Signal Path 312 may carry the video (e.g., avatar selection and/or avatar parameters) and audio information direction to home AP 314 after the connection has been established. Device 112' may then receive the connection establishment request and may be configured to determine whether to accept the request. Determining whether to accept the request may include, for example, presenting a visual narrative to a user of device 112' inquiring as to whether to accept the connection request from device 102'. Should the user of device 112' accept the connection (e.g., accept the video call) the connection may be established. Cameras 104' and 114' may be configured to then start capturing images of the respective users of devices 102' and 112', respectively, for use in animating the avatars selected by each user.

Microphones 106' and 116' may be configured to then start capturing audio from each user. As information exchange commences between devices 102' and 112', displays 108' and 118' may display and animate avatars corresponding to the users of devices 102' and 112'.

Figure 4:
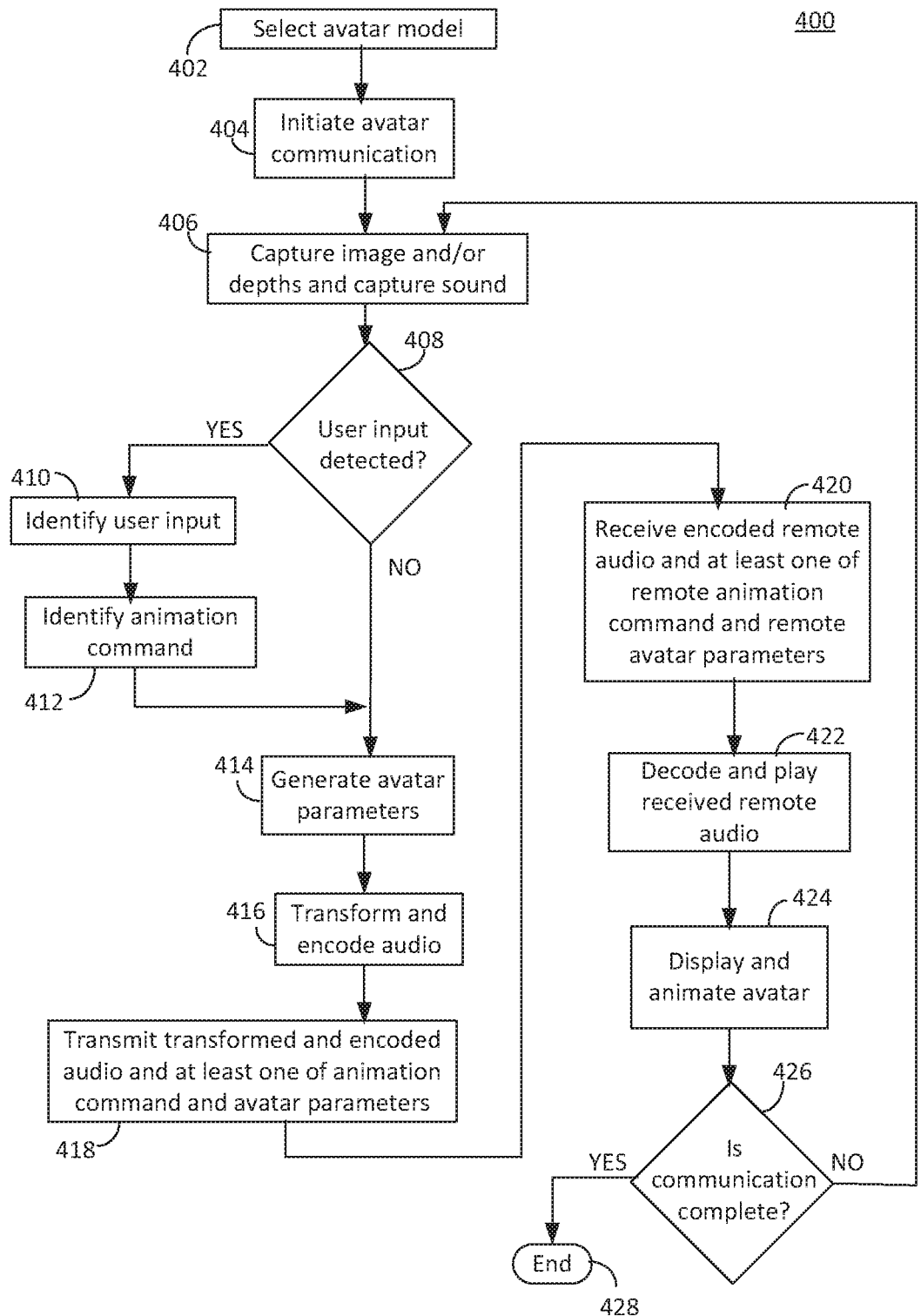
FIG. 4 is a flowchart of example operations in accordance with at least one embodiment of the present disclosure.

FIG. 4 illustrates a flowchart 400 of exemplary operations consistent with an embodiment of the present disclosure. The operations may be performed, for example, by devices 102 and/or 112. In particular, flowchart 400 depicts exemplary operations configured to implement avatar animations (including passive animations and/or interactive animations) and/or audio transformations for communication between devices over a network. It is assumed that facial detection and tracking, feature extraction and passive avatar animation are implemented and operational as described herein.

An avatar model may be selected at operation 402. The avatar model may include a video avatar selection and an audio transformation selection. A plurality of video avatar models may be displayed from which a user may select a desired avatar. In an embodiment, selecting a video avatar model may include an associated audio transformation. For example, a cat-like avatar may be associated with a cat-like audio transformation. In another embodiment, audio transformations may be selected independent of the video avatar selection.

Avatar models, including audio transformations, may be selected prior to activating communication, but may also be changed during the course of an active communication. Thus, it may be possible to send or receive an avatar selection and/or change an audio transformation selection at any point during the communication, and for the receiving device to change the displayed avatar in accordance with the received avatar selection.

Avatar communication may be activated at operation 404. For example, a user may launch an application configured to communicate audio and video using an avatar as described herein. Operation 404 may include configuring communication and establishing a connection. Communication configuration includes the identification of at least one remote device or a virtual space for participation in the video call. For example, a user may select from a list of remote users/devices stored within the application, stored in association with another system in the device (e.g., a contacts list in a smart phone, cell phone, etc.), stored remotely, such as on the Internet (e.g., in a social media website like Facebook, LinkedIn, Yahoo, Google+, MSN, etc.). Alternatively, the user may select to go online in a virtual space like Second Life.

A camera in the device may then begin capturing images and/or depths and a microphone in the device may begin capturing sound at operation 406. The images may be still images or live video (e.g., multiple images captured in sequence). The depths may be captured with the images or may be captured separately. Depths correspond to distances from the camera to objects (and points on the objects) in the camera's field of view. Whether a user input is detected may be determined at operation 408. User inputs include gestures captured by image and/or depth cameras and touch inputs detected on touch-sensitive display. If a user input is detected, the user input may be identified at operation 410. A user input identifier includes a touch identifier or a gesture identifier. The touch identifier may be determined based on a touch on the touch-sensitive display and may include touch type and touch location(s). The gesture identifier may be determined based on captured image and/or depth data and may include recognizing a gesture.

An animation command may be identified at operation 412. The animation command may be configured to animate the user's selected avatar displayed on the remote device or to animate the remote user's feedback avatar also displayed on the remote user's device. Animation command corresponds to desired responses associated with the user inputs. For example, touching a displayed avatar's face (user input) may result in a color change (desired response identified by animation command) of the displayed avatar's face. The animation command may be identified based on the identified user input. For example, each user input may be related to (e.g., associated with) an animation command in a database of user input identifiers and animation commands.

Operation 414 includes generating avatar parameters. The avatar parameters include passive components and may include interactive components. If no user input is detected, the avatar parameters may include passive components. If a user input is detected, whether the avatar parameters may include interactive components depends on the animation command and therefore the user input. For user inputs corresponding to animation commands configured to animate the user's selected avatar, the animation command may be transmitted with avatar parameters that include only passive components or may be applied to the avatar parameters prior to transmitting so that the transmitted avatar parameters include both passive and interactive components. For inputs corresponding to animation commands configured to animate the remote user's feedback avatar displayed on the remote user's device, only the animation command may be transmitted.

Operation 416 includes transforming and encoding captured audio. Captured audio may be converted into an audio signal (e.g., user speech signal). The user speech signal may be transformed according to the audio transform portion of avatar selection of operation 402. Transformed user speech signal corresponds to avatar speech signal. The avatar speech signal may be encoded using known techniques for transmission over the network to a remote device and/or virtual space. Transformed and encoded audio may be transmitted at operation 418. Operation 418 may further include transmitting at least one of an animation command and avatar parameters. Transmitting the animation command is configured to allow the remote device to animate a locally displayed avatar by modifying avatar parameters according to the animation command. Transmitted avatar parameters that have been modified according to the animation command prior to transmission may be directly utilized to animate an avatar displayed on the remote device. In other words, modifications to avatar parameters represented by animation command may be performed locally or remotely.

Operation 420 includes receiving remote encoded audio that may be transformed audio. Operation 420 further includes receiving at least one of a remote animation command and remote avatar parameters. The remote animation command may be utilized to modify avatar parameters corresponding to a remote user's displayed avatar or a local user's displayed feedback avatar. The animation command and avatar parameters are configured to result in an avatar animation that is modified based on a user input. The received audio may be decoded and played at operation 422 and the avatar may be displayed and animated at operation 424.

Animation of the displayed avatar may be based on detected and identified user inputs as described herein. In the instance of device-to-device communication (e.g., system 100), at least one of remote avatar selection or remote avatar parameters may be received from the remote device. An avatar corresponding to the remote user may then be displayed based on the received remote avatar selection, and may be animated based on the received remote avatar parameters. In the instance of virtual place interaction (e.g., system 126), information may be received allowing the device to display what the avatar corresponding to the device user is seeing.

Whether communication is complete may be determined at operation 426. If communication is complete program flow may end at operation 428. If communication is not complete, program flow may proceed to operation 406, capturing images, depths and/or audio.

While FIG. 4 illustrates various operations according to an embodiment, it is to be understood that not all of the operations depicted in FIG. 4 are necessary for other embodiments. Indeed, it is fully contemplated herein that in other embodiments of the present disclosure, the operations depicted in FIG. 4 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "app" may be embodied in code or instructions that may be executed on programmable circuitry such as a host processor or other programmable circuitry.

As used in any embodiment herein, the term "module" may refer to an app, software, firmware and/or circuitry configured to perform any of the aforementioned operations. Software may be embodied as a software package, code, instructions, instruction sets and/or data recorded on at least one non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

Thus, the present disclosure provides a method and system for interactively animating avatars used for conducting a video communication instead of live images. The use of avatars reduces the amount of information to exchange as compared to the sending of live images. The system and method are further configured to transform user speech into avatar speech by, for example, pitch shifting and/or time stretching captured audio signals. Interactive animation of the avatars may be based on detected user inputs including touch(es) and gestures. The interactive animation is configured to modify animations determined based on facial detection and tracking.

According to one aspect there is provided a system. The system may include a user input device configured to capture a user input; a communication module configured to transmit and receive information, and one or more storage mediums. In addition, the one or more storage mediums having stored thereon, individually or in combination, instructions that when executed by one or more processors result in the following operations comprising: selecting an avatar; initiating communication; detecting a user input; identifying the user input; identifying an animation command based on the user input; generating avatar parameters; and transmitting at least one of the animation command and the avatar parameters.

Another example system includes the forgoing components and further includes a microphone configured to capture sound and convert the captured sound into a corresponding audio signal, and the instructions that when executed by one or more processors result in the following additional operations: capturing user speech and converting the user speech into a corresponding user speech signal; transforming the user speech signal into an avatar speech signal; and transmitting the avatar speech signal.

Another example system includes the forgoing components and further includes a camera configured to capture images, and the instructions that when executed by one or more processors result in the following additional operations: capturing an image; detecting a face in the image; extracting features from the face; and converting the features into avatar parameters.

Another example system includes the forgoing components and further includes a display, and the instructions that when executed by one or more processors result in the following additional operations: displaying at least one avatar; receiving at least one of a remote animation command and remote avatar parameters; and animating one displayed avatar based on at least one of the remote animation command and the remote avatar parameters.

Another example system includes the forgoing components and further includes a speaker configured to convert an audio signal into sound, and the instructions that when executed by one or more processors result in the following additional operations: receiving a remote avatar speech signal; and converting the remote avatar speech signal into avatar speech.

Another example system includes the forgoing components and the user input device is a camera configured to capture distances and the user input is a gesture.

Another example system includes the forgoing components and the user input device is a touch-sensitive display and the user input is a touch event.

Another example system includes the forgoing components and the transforming comprises at least one of pitch shifting and time stretching.

According to another aspect there is provided a method. The method may include selecting an avatar; initiating communication; detecting a user input; identifying the user input; identifying an animation command based on the user input; generating avatar parameters based on the animation command; and transmitting at least one of the animation command and the avatar parameters.

Another example method includes the forgoing operations and further includes capturing user speech and converting the user speech into a corresponding user speech signal; transforming the user speech signal into an avatar speech signal; and transmitting the avatar speech signal.

Another example method includes the forgoing operations and further includes capturing an image; detecting a face in the image; extracting features from the face; and converting the features into avatar parameters.

Another example method includes the forgoing operations and further includes displaying at least one avatar; receiving at least one of a remote animation command and remote avatar parameters; and animating one displayed avatar based on at least one of the remote animation command and the remote avatar parameters.

Another example method includes the forgoing operations and further includes receiving a remote avatar speech signal; and converting the remote avatar speech signal into avatar speech.

Another example method includes the forgoing operations and the user input is a gesture.

Another example method includes the forgoing operations and the user input is a touch event.

Another example method includes the forgoing operations and the transforming comprises at least one of pitch shifting and time stretching.

According to another aspect there is provided a system. The system may include one or more storage mediums having stored thereon, individually or in combination, instructions that when executed by one or more processors result in the following operations including selecting an avatar; initiating communication; detecting a user input; identifying the user input; identifying an animation command based on the user input; generating avatar parameters; and transmitting at least one of the animation command and the avatar parameters.

Another example system includes instructions that when executed by one or more processors result in the forgoing operations and also includes capturing user speech and converting the user speech into a corresponding user speech signal; transforming the user speech signal into an avatar speech signal; and transmitting the avatar speech signal.

Another example system includes instructions that when executed by one or more processors result in the forgoing operations and also includes capturing an image; detecting a face in the image; extracting features from the face; and converting the features into avatar parameters.

Another example system includes instructions that when executed by one or more processors result in the forgoing operations and also includes displaying at least one avatar; receiving at least one of a remote animation command and remote avatar parameters; and animating one displayed avatar based on at least one of the remote animation command and the remote avatar parameters.

Another example system includes instructions that when executed by one or more processors result in the forgoing operations and also includes receiving a remote avatar speech signal; and converting the remote avatar speech signal into avatar speech.

Another example system includes instructions that when executed by one or more processors result in the forgoing operations and the user input is a gesture.

Another example system includes instructions that when executed by one or more processors result in the forgoing operations and the user input is a touch event.

Another example system includes instructions that when executed by one or more processors result in the forgoing operations and the transforming comprises at least one of pitch shifting and time stretching.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An electronic device comprising:
   a touchscreen display;
   a camera;
   a speaker;
   a microphone;
   communication circuitry to establish, over a network, a video call with a remote electronic device;
   memory;
   instructions in the electronic device; and
   processor circuitry to execute the instructions to:
      identify selection of a first avatar by a first user of the electronic device;
      access images of the first user from the camera during the video call, the images including a head and a face of the first user;
      animate the first avatar, based on the images, to produce a first animated avatar to mimic motion of the head and expressions of the face of the first user during the video call;
      cause the communication circuitry to transmit data to the remote electronic device to (1) display the first animated avatar of the first user on a display of the remote electronic device during the video call and (2) output sound corresponding to speech of the first user during the video call;
      cause the touchscreen display to present a second animated avatar of a head and a face of a second user of the remote electronic device during the video call;
      cause the speaker to output sound corresponding to audio from the remote electronic device during the video call, the audio representative of speech of the second user;
      cause the touchscreen display to present the first animated avatar to represent an appearance of the first animated avatar on the display of the remote electronic device to provide feedback to the first user, the first and second animated avatars to be presented simultaneously on the touchscreen display during on the video call, the first animated avatar to have a first size, the second animated avatar to have a second size, the first size smaller than the second size;
      cause the touchscreen display to change a color of a face of the second animated avatar during the video call based on a signal from the remote electronic device;

in response to a first user input on the touchscreen display during the video call:
cause the touchscreen display to change a color of a face of the first animated avatar; and
cause the communication circuitry to transmit an indication of the change to the color of the face of the first animated avatar to the remote electronic device to cause a change of the color of the face of the first animated avatar on the display of the remote electronic device; and
in response to a second user input on the touchscreen display during the video call:
cause the touchscreen display to modify an appearance of a portion of the face of the first animated avatar; and
cause the communication circuitry to transmit an indication of the modification to the remote electronic device to cause a corresponding modification to the appearance of the portion of the face of the first animated avatar of the first user on the display of the remote electronic device.

2. The electronic device of claim 1, wherein the processor circuitry is to cause the touchscreen display to present the first animated avatar in a rectangular area.

3. The electronic device of claim 2, wherein the rectangular area is a window.

4. The electronic device of claim 1, wherein the processor circuitry is to cause the touchscreen display to present the first animated avatar in a lower right corner of the touchscreen display.

5. The electronic device of claim 1, wherein the processor circuitry is to cause the touchscreen display to change the color of the face of the first animated avatar in response to a single tap on the touchscreen display.

6. The electronic device of claim 1, wherein the processor circuitry is to identity selection of the first avatar by the first user during the video call.

7. The electronic device of claim 1, wherein the second user input is a touch event on the touchscreen display at a location corresponding to the portion of the face of the first animated avatar.

8. The electronic device of claim 1, wherein, to animate the first avatar, the processor circuitry is to:
detect the face of the first user in the images from the camera;
extract features from the face of the first user; and
produce the first animated avatar based at least in part on the features extracted from the face of the first user.

9. The electronic device of claim 1, wherein the electronic device is a smart phone.

10. The electronic device of claim 1, wherein the camera includes a depth camera.

11. At least one non-transitory storage device comprising instructions that, when executed, cause at least one processor of an electronic device to at least:
cause communication circuitry of the electronic device to establish, over a network, a video call with a remote electronic device;
identify selection of a first avatar by a first user of the electronic device;
access images of the first user from a camera of the electronic device during the video call, the images including a head and a face of the first user;
animate the first avatar, based on the images, to produce a first animated avatar to mimic motion of the head and expressions of the face of the first user during the video call;
cause the communication circuitry to transmit data to the remote electronic device to (1) display the first animated avatar of the first user on a display of the remote electronic device during the video call and (2) output sound corresponding to speech of the first user during the video call;
cause a touchscreen display of the electronic device to present a second animated avatar of a head and a face of a second user of the remote electronic device during the video call;
cause a speaker of the electronic device to output sound corresponding to audio from the remote electronic device during the video call, the audio representative of speech of the second user;
cause the touchscreen display to present the first animated avatar to represent an appearance of the first animated avatar on the display of the remote electronic device to provide feedback to the first user, the first and second animated avatars to be presented simultaneously on the touchscreen display during the video call, the first animated avatar to have a first size, the second animated avatar to have a second size, the first size smaller than the second size;
cause the touchscreen display to change a color of a face of the second animated avatar during the video call based on a signal from the remote electronic device;
in response to a first user input on the touchscreen display during the video call:
cause the touchscreen display to change a color of a face of the first animated avatar; and
cause the communication circuitry to transmit an indication of the change to the color of the face of the first animated avatar to the remote electronic device to cause a change of the color of the face of the first animated avatar on the display of the remote electronic device; and
in response to a second user input on the touchscreen display during the video call:
cause the touchscreen display to modify an appearance of a portion of the face of the first animated avatar; and
cause the communication circuitry to transmit an indication of the modification to the remote electronic device to cause a corresponding modification to the appearance of the portion of the face of the first animated avatar of the first user on the display of the remote electronic device.

12. The at least one non-transitory storage device of claim 11, wherein the instructions, when executed, cause the at least one processor to cause the touchscreen display to present the first animated avatar in a rectangular area.

13. The at least one non-transitory storage device of claim 12, wherein the rectangular area is a window.

14. The at least one non-transitory storage device of claim 11, wherein the instructions, when executed, cause the at least one processor to cause the touchscreen display to present the first animated avatar in a lower right corner of the touchscreen display.

15. The at least one non-transitory storage device of claim 11, wherein the instructions, when executed, cause the at least one processor to cause the touchscreen display to change the color of the face of the first animated avatar in response to a single tap on the touchscreen display.

16. The at least one non-transitory storage device of claim 11, wherein the instructions, when executed, cause the at least one processor to identity selection of the first avatar by the first user during the video call.

17. The at least one non-transitory storage device of claim 11, wherein the second user input is on the touchscreen display at a location corresponding to the portion of the face of the first animated avatar.

18. The at least one non-transitory storage device of claim 11, wherein, to animate the first avatar, the instructions, when executed, cause the at least one processor to:
detect the face of the first user in the images from the camera;
extract features from the face of the first user; and
produce the first animated avatar based at least in part on the features extracted from the face of the first user.

19. A method of animating avatars on an electronic device, the method comprising:
establishing a video call over a network with a remote electronic device;
identifying selection of a first avatar by a first user of the electronic device;
accessing images of the first user from a camera of the electronic device during the video call, the images including a head and a face of the first user;
animating the first avatar, based on the images, to produce a first animated avatar to mimic motion of the head and expressions of the face of the first user during the video call;
transmitting data to the remote electronic device to, during the video call, (1) display the first animated avatar of the first user on a display of the remote electronic device and (2) output sound corresponding to speech of the first user;
presenting a second animated avatar of a head and a face of a second user of the remote electronic device during the video call;
causing a speaker of the electronic device to output sound corresponding to audio from the remote electronic device during the video call, the audio representative of speech of the second user;
presenting the first animated avatar to represent an appearance of the first animated avatar on the display of the remote electronic device to provide feedback to the first user, the first and second animated avatars to be presented simultaneously during the video call, the first animated avatar to have a first size, the second animated avatar to have a second size, the first size smaller than the second size;
changing a color of a face of the second animated avatar based on a signal from the remote electronic device during the video call;
in response to a first user input during the video call, transmitting an indication of a color change to the remote electronic device to change a color of a face of the first animated avatar of the first user on the display of the remote electronic device; and
in response to a second user input during the video call:
modifying an appearance of a portion of the face of the first animated avatar; and
transmitting an indication of the modification to the remote electronic device to cause a corresponding modification to the appearance of the portion of the face of the first animated avatar of the first user on the display of the remote electronic device.

20. The method of claim 19, wherein presenting the first animated avatar includes presenting the first animated avatar in a rectangular area on a touchscreen display of the electronic device.

21. The method of claim 20, wherein presenting the first animated avatar in the rectangular area includes presenting the first animated avatar in a window on the touchscreen display.

22. The method of claim 19, wherein presenting the first animated avatar includes presenting the first animated avatar in a lower right corner of a touchscreen display of the electronic device.

23. The method of claim 19, wherein the transmitting of the indication of the color change to the remote electronic device is in response to a single tap on a touchscreen display of the electronic device.

24. The method of claim 19, wherein the identifying of the selection of the first avatar by the first user occurs during the video call.

25. The method of claim 19, wherein the second user input is a touch event on a touchscreen display at a location corresponding to the portion of the face of the first animated avatar.

26. The method of claim 19, wherein the animating of the first avatar includes:
detecting the face of the first user in the images from the camera;
extracting features from the face of the first user; and
producing the first animated avatar based at least in part on the features extracted from the face of the first user.

* * * * *